United States Patent
Arimura

(10) Patent No.: US 9,374,023 B2
(45) Date of Patent: Jun. 21, 2016

(54) POWER CONVERSION CONTROL DEVICE AND POWER CONVERSION DEVICE USING THE SAME

(71) Applicant: DENSO CORPORATION, Kariya, Aichi-pref. (JP)

(72) Inventor: Seikoh Arimura, Obu (JP)

(73) Assignee: DENSO CORPORATION, Kariya (JP)

( * ) Notice: Subject to any disclaimer, the term of this patent is extended or adjusted under 35 U.S.C. 154(b) by 269 days.

(21) Appl. No.: 13/850,649

(22) Filed: Mar. 26, 2013

(65) Prior Publication Data

US 2013/0250636 A1  Sep. 26, 2013

(30) Foreign Application Priority Data

Mar. 26, 2012 (JP) ................................. 2012-069809
Oct. 26, 2012 (JP) ................................. 2012-237231

(51) Int. Cl.
   *H02M 7/797*  (2006.01)
   *H02M 3/158*  (2006.01)
   *B60L 11/18*  (2006.01)

(52) U.S. Cl.
   CPC ........... *H02M 7/797* (2013.01); *B60L 11/1803* (2013.01); *H02M 3/1582* (2013.01); *B60L 2210/14* (2013.01); *Y02T 10/7005* (2013.01); *Y02T 10/7225* (2013.01)

(58) Field of Classification Search
   None
   See application file for complete search history.

(56) References Cited

U.S. PATENT DOCUMENTS

| 2006/0055349 | A1  | 3/2006 | Nakayama et al. |
| 2006/0114702 | A1  | 6/2006 | Yamada et al. |
| 2006/0152085 | A1* | 7/2006 | Flett et al. ........................ 307/75 |
| 2008/0012540 | A1* | 1/2008 | Chen ............................ 323/224 |
| 2008/0084197 | A1* | 4/2008 | Williams et al. ............... 323/282 |
| 2012/0049774 | A1  | 3/2012 | Takamatsu et al. |

FOREIGN PATENT DOCUMENTS

| JP | 2004-112904 | 4/2004 |
| JP | 2006-187186 | 7/2006 |
| JP | 2008-131760 | 6/2008 |
| JP | 2010-051111 | 3/2010 |

(Continued)

OTHER PUBLICATIONS

Office Action (3 pages) dated Dec. 8, 2015 issued in corresponding Japanese Application No. 2012-237231 and English translation (3 pages).

*Primary Examiner* — Timothy J Dole
*Assistant Examiner* — Monica Mata
(74) *Attorney, Agent, or Firm* — Nixon & Vanderhye PC

(57) ABSTRACT

The present application presents a power conversion control device that does not reduce electric power conversion efficiency. A mode judging section judges whether a direction of current flowing through an inductor has been reversed or not based on both an average value of current flowing through the inductor, the average value being calculated by an average current calculating section, and a difference (i.e peak current) between a maximum value and a minimum value of a current flowing through the inductor, the difference being calculated by a peak current calculating section. And then if the judging section has determined that the direction of current flowing through an inductor has been reversed, the power conversion control device makes the switching elements ON/OFF-operation corresponding to either one of a power running mode or an electric power regenerating mode.

15 Claims, 17 Drawing Sheets

(56) References Cited

FOREIGN PATENT DOCUMENTS

| JP | 2011-050221 | 3/2011 |
| JP | 2011-114931 | 6/2011 |
| JP | 2011-223674 | 11/2011 |
| JP | 2012-010528 | 1/2012 |
| WO | WO 2004/114511 | 12/2004 |
| WO | WO 2010/137127 | 12/2010 |

* cited by examiner

FIG.1
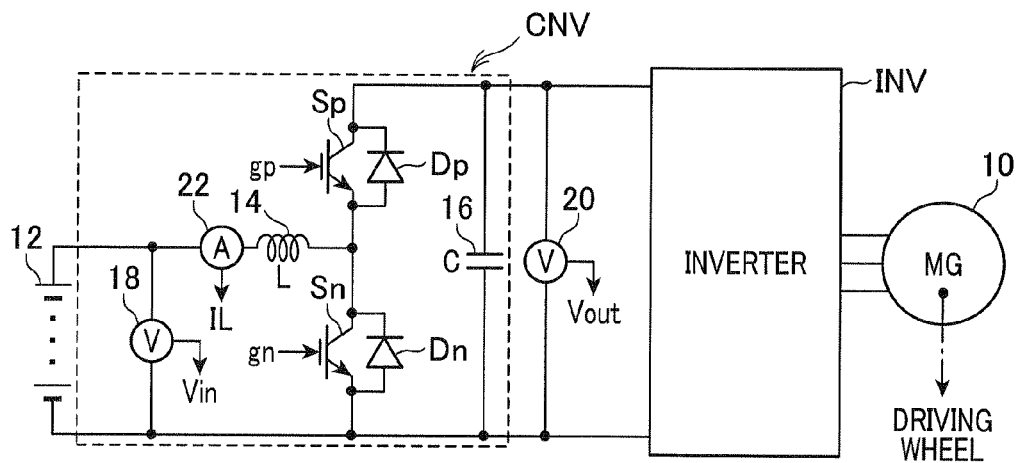
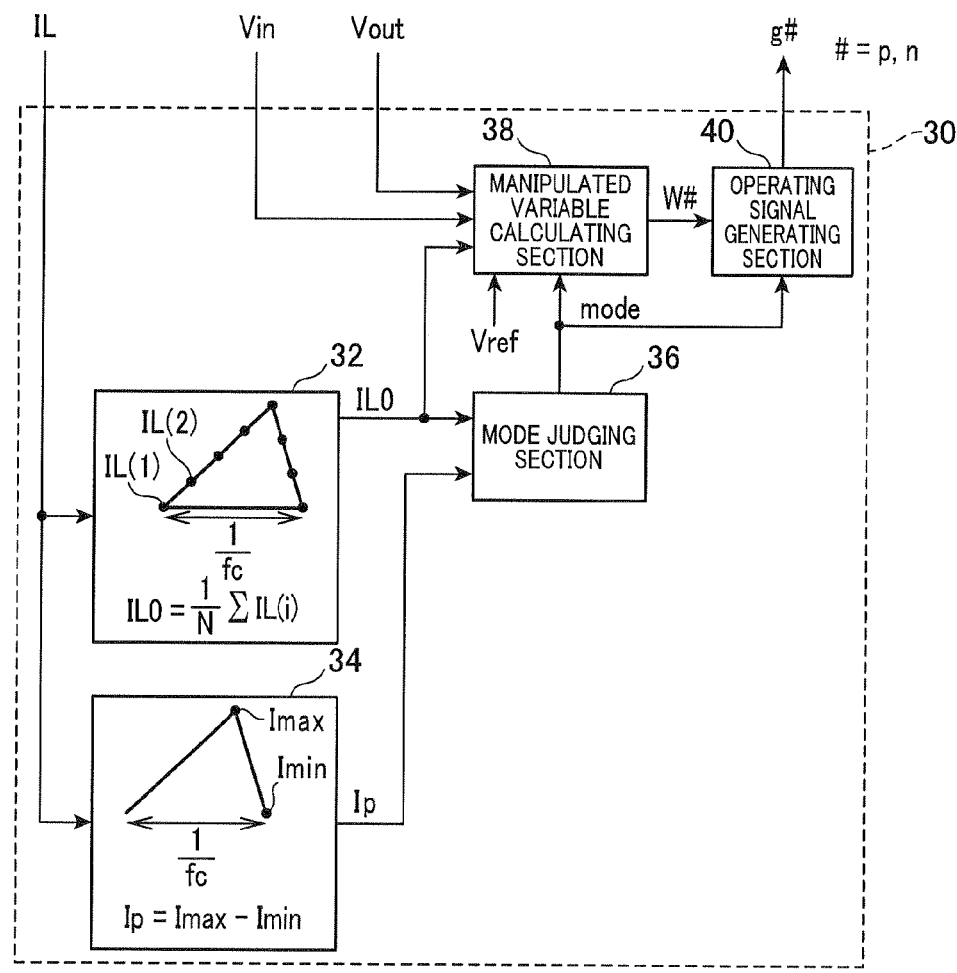

FIG.3
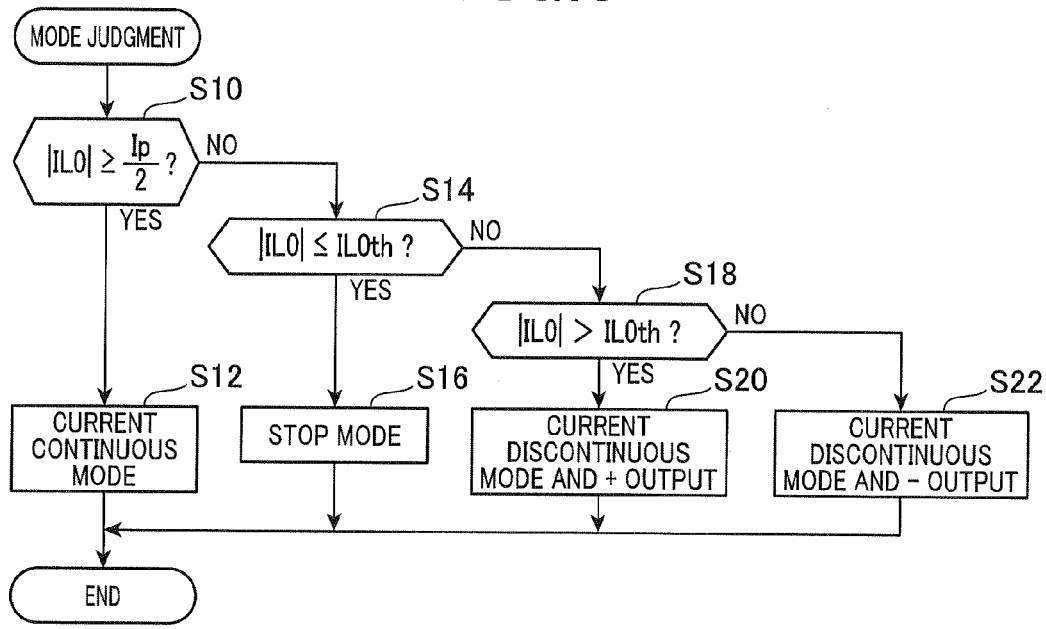
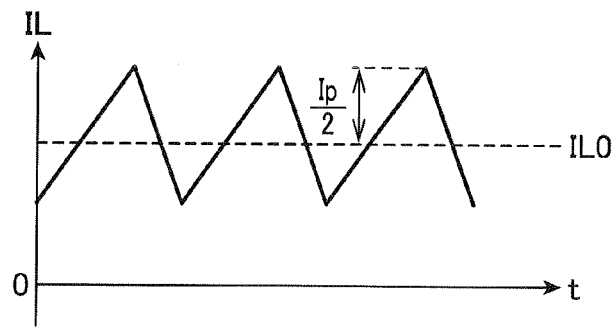
FIG.4A
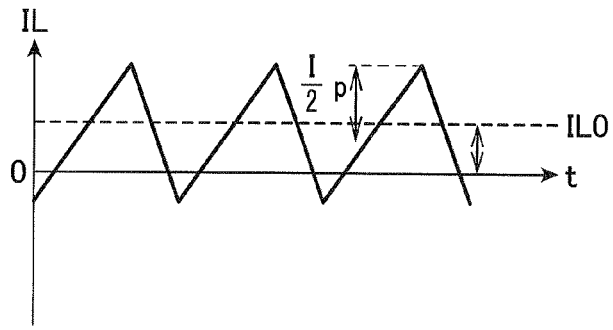
FIG.4B

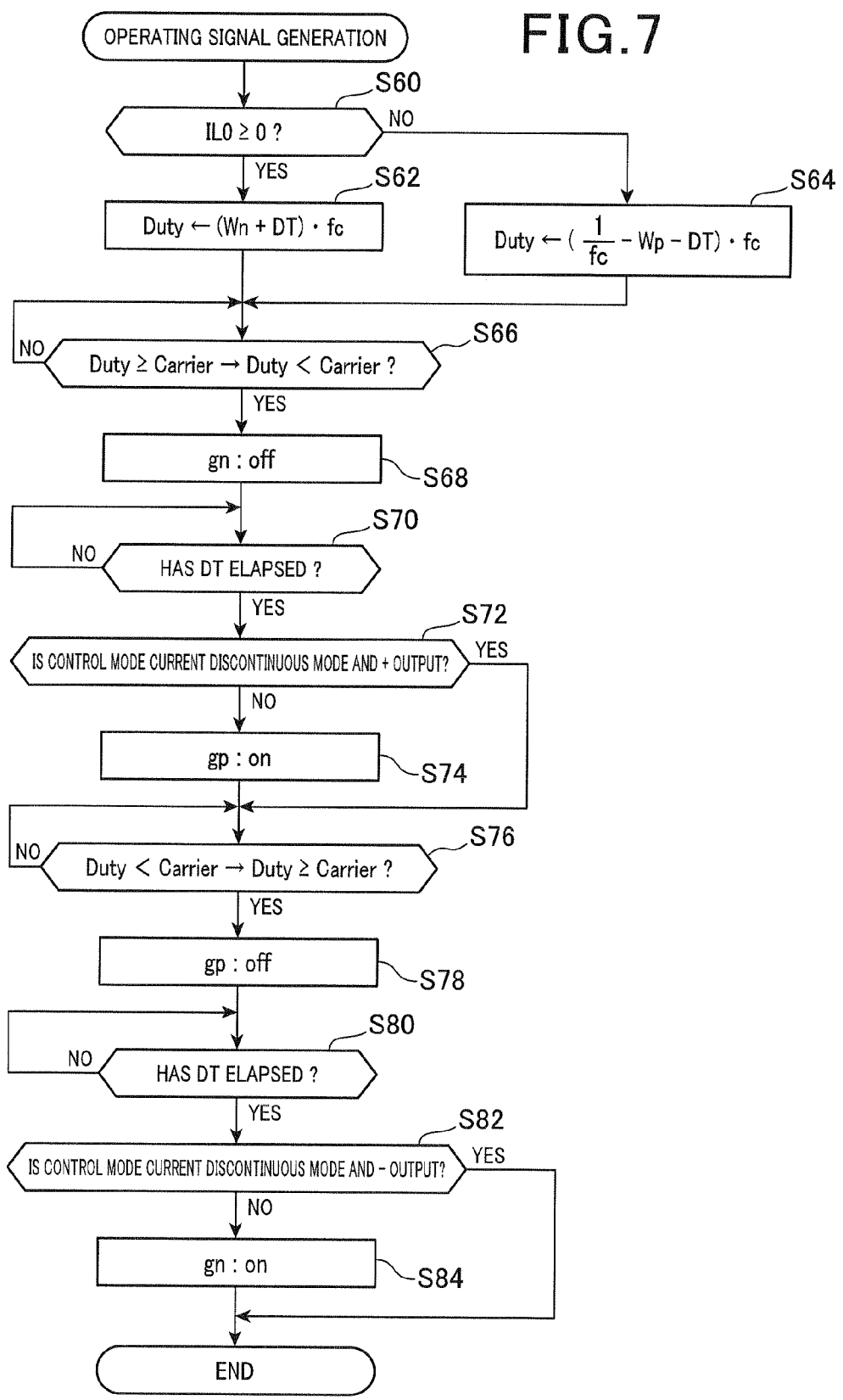

FIG.9
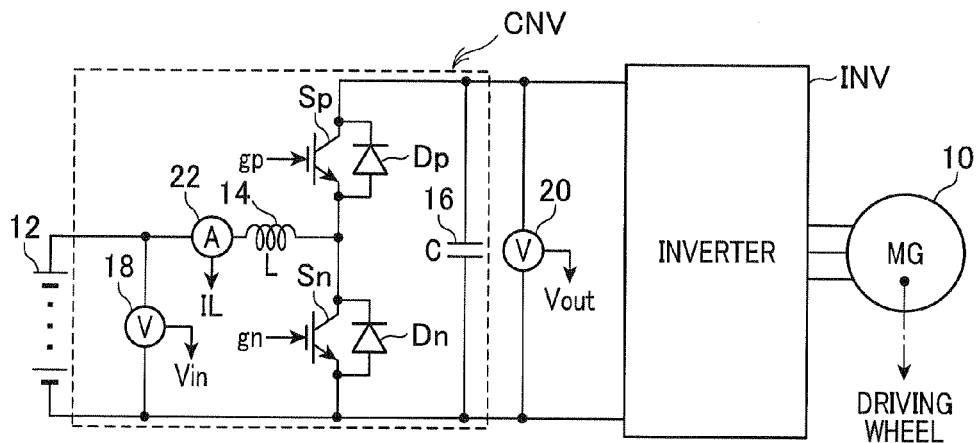
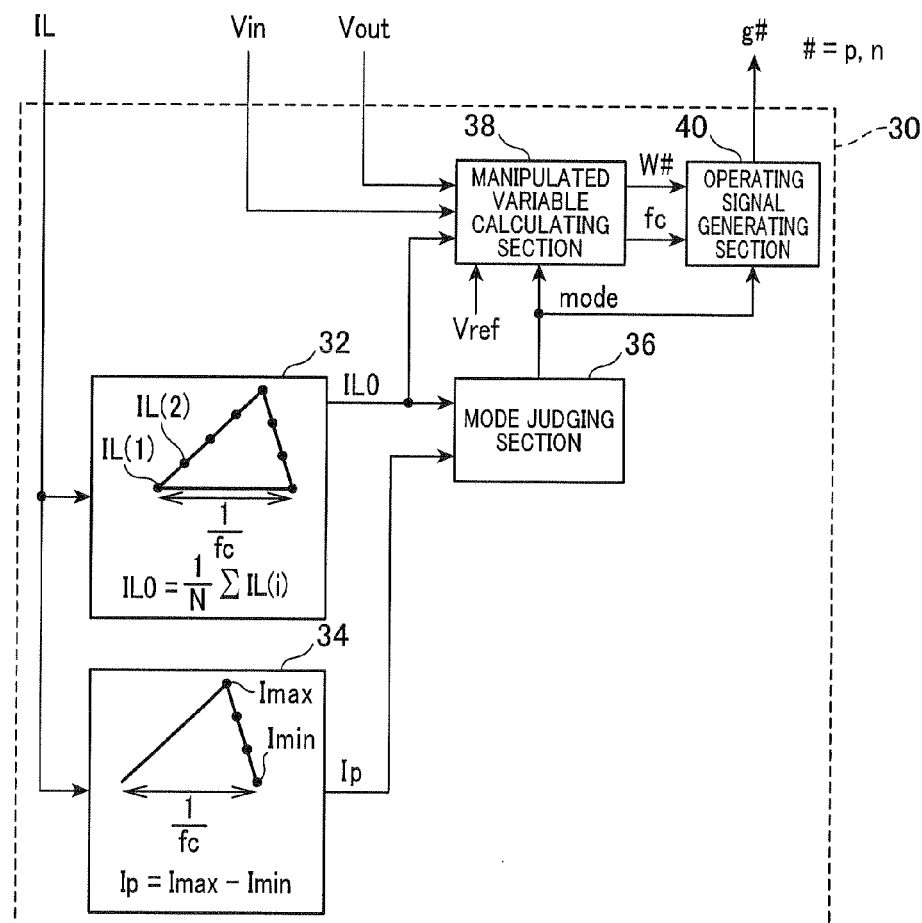

FIG.15
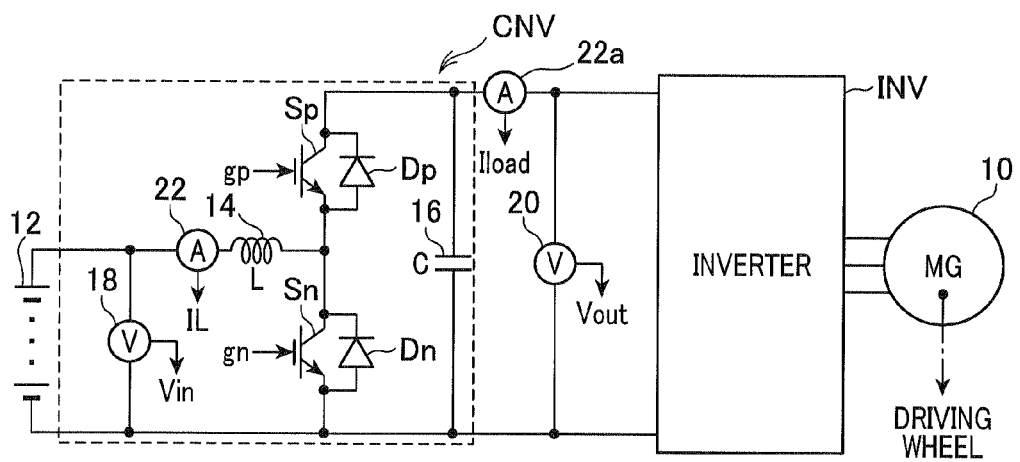
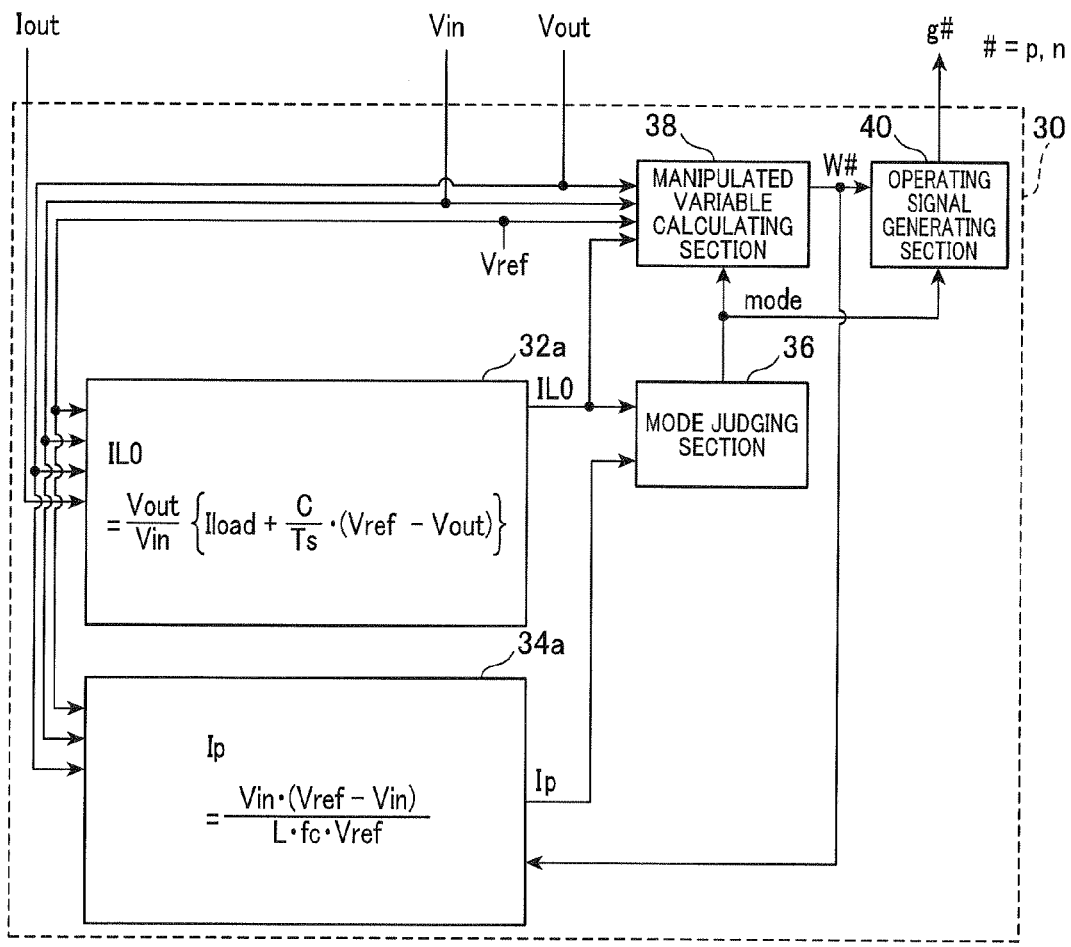

POWER CONVERSION CONTROL DEVICE AND POWER CONVERSION DEVICE USING THE SAME

CROSS-REFERENCE TO RELATED APPLICATION

This application is based on and claims the benefit of priorities from earlier Japanese Patent Application Nos. 2012-069809 and 2012-237231 filed Mar. 26 and Oct. 26, 2012, respectively, the descriptions of which are incorporated herein by reference.

BACKGROUND OF THE INVENTION

1. Field of the Invention

The present invention relates to a power conversion control device. Specifically, the present invention relates to a power conversion control device that can be used for power conversion control of a motor generator used in a hybrid car or the like as a main driving engine.

2. Description of the Related Art

A motor generator drives a steering system as a main driving engine of a hybrid car (power running mode). In addition, the motor generator generates electric power by using the driving force from the system when the hybrid car is running using a gasoline engine (including when braking) that is a supplemental driving engine, and charges a battery (power regeneration mode). When the motor generator is used as an electric motor, electric power supplied from the battery is stepped up (i.e boosted) by a converter. The electric power is then converted to alternating current voltage by an inverter, and the motor is driven. In power regeneration mode, the electric power supplied from the power generator is stepped down by the converter, and the battery is charged. The converter (power conversion circuit) converts electric power that is given and received between the battery and the inverter.

A known converter includes an upper-arm switching element, a lower-arm switching element, diodes, an inductor, and a capacitor. The diodes are connected in reverse parallel with each switching elements. The inductor is connected between the connection point of the switching elements and a positive terminal of the battery. The capacitor is connected in parallel with the series connection body comprising of the lower-arm switching element and the upper-arm switching element.

In the converter, during power running, energy is stored in the inductor by the lower-arm switching element being turned ON. The energy in the inductor is discharged through the upper-arm diode by the lower-arm switching element being turned OFF. On the other hand, during regeneration, energy is stored in the inductor by the upper-arm switching element being turned ON. The energy in the inductor is discharged by of the upper-arm switching element being turned OFF.

The output voltage of the converter is controlled by the upper-arm switching element and the lower-arm switching element that is alternately turned OFF, regardless of whether the motor generator is in power running mode or power regeneration mode.

Here, when the ON operation is switched to another switching element, a dead time is provided during which both switching elements are turned OFF. When the direction of a current flowing through the inductor (also referred to as reactance) is reversed, error attributed to the dead time increases.

Therefore, for example, as in JP-A-2011-223674, variably setting carrier frequency in a pulse-width modulation (PWM) process for generating operating signals of the switching elements based on the size of the current flowing through the inductor is proposed. However, in this technology, in a state in which the current flowing through the inductor is small and the direction is reversed, electric power conversion efficiency may decrease as a result of the current outputted from the battery to the capacitor side returning from the capacitor side to the battery side during a single ON/OFF cycle of the switching elements. Therefore, a power conversion control device is desired that does not reduce electric power conversion efficiency.

SUMMARY

As a typical example, the present application provides a power conversion control device that electronically controls a power conversion circuit. The power conversion circuit has an inductor, a power running-mode current restricting element, and a power regeneration-mode current restricting element. The power running-mode current restricting element and the power regeneration-mode current restricting element are connected to the inductor and each configured by a parallel circuit composed of a rectifying element and a switching element that is opened and closed by electronic control from outside. The power conversion control device performs: i) power running control for maintaining the switching element of the power regeneration-mode current restricting element in an open state while opening and closing the switching element of the power running-mode current restricting element; ii) power regeneration control for maintaining the switching element of the power running-mode current restricting element in an open state while opening and closing the switching element of the power regeneration-mode current restricting element; iii) complementary control for alternately closing the respective switching elements of the power running-mode current restricting element and the power regeneration-more current restricting element; and iv) a switching process for judging whether or not a direction of a current flowing through the inductor during a closed period of the switching element of the power running-mode current restricting element or a closed period of the switching element of the power regeneration-mode current restricting element is reversed as a result of the complementary control being performed, and thereby under a condition that the direction is judged to be reversed, switching from the complementary control to the power running control or the power regeneration control.

In a conventional power conversion device, when the direction of the current flowing through the inductor during the closed period of the power running-mode current restricting element is reversed, the current flowing through the inductor flows bi-directionally on a current path in the power running-mode current restricting element during the closed period.

In this instance, due to an electric power loss in the current restricting element, power conversion efficiency is reduced.

On the other hand, when the direction of the current flowing through the inductor during the closed period of the power regeneration-mode current restricting element is reversed, the current flowing through the inductor flows bi-directionally on a current path in the power regeneration-mode current restricting element during the closed period. In this instance, due to an electric power loss in the current restricting element, power conversion efficiency is also reduced.

In this regard, in the above-described typical example, complementary control is switched to power running control or power regeneration control under a condition that the direction of the current flowing through the inductor is judged to be reversed. Therefore, such situations can be prevented.

Moreover, reduction in power conversion efficiency can be suppressed.

Expansion of the concepts related to the representative embodiments of the present invention, described hereafter, are described in other embodiments after the description of the representative embodiments.

BRIEF DESCRIPTION OF THE DRAWINGS

FIG. 1 is a diagram of a system configuration according to a first embodiment;

FIG. 3 is a flowchart of procedures in a process performed by a mode judging section according to the first embodiment;

FIG. 4A and FIG. 4B are time charts for describing a mode judging method;

FIG. 7 is a flowchart of procedures in a process performed by an operating signal generating section according to the first embodiment;

FIG. 9 is a diagram of a system configuration according to a second embodiment;

FIG. 15 is a diagram of a system configuration according to a sixth embodiment;

DETAILED DESCRIPTION OF THE PREFERRED EMBODIMENTS

First Embodiment

Figure 2A:
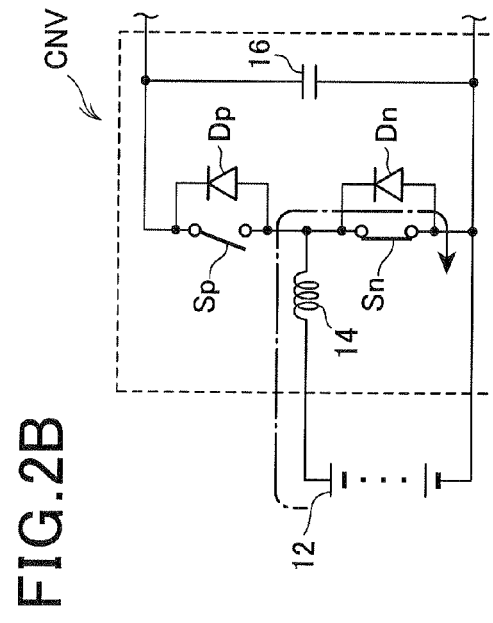
FIG. 2A to FIG. 2D are circuit diagrams of an operation of a converter at zero-crossing according to the first embodiment.

A first embodiment in which a power conversion device of the present invention is applied to a power supply of a system including a rotating electrical machine as on-board main driving engine of a hybrid car will hereinafter be described with reference to the drawings.

A motor generator 10 shown in FIG. 1 is an electric motor/power generator serving as a main driving engine. A rotor of the motor generator 10 is mechanically connected to a driving wheel. The motor generator 10 is connected to a battery 12 with a direct-current/alternating-current conversion circuit (inverter INV) and a voltage conversion circuit (converter CNV) therebetween. The battery 12 is a secondary battery serving as an energy storage means of the motor generator 10. Here, a battery pack serving as a serially connected member composed by a plurality of battery cells is given as an example of the battery 12.

The converter CNV is a known step-up/step-down chopper circuit. The converter CNV includes a smoothing capacitor 16, a serially connected member composed of switching elements Sp and Sn, an inductor 14, and diodes Dp and Dn. The switching elements Sp and Sn are connected in parallel with the smoothing capacitor 16. The inductor 14 connects a connection point of the switching elements Sp and Sn with the battery 12. The diodes Dp and Dn are connected in reverse parallel with the switching elements Sp and Sn.

In other words, a step-up process includes a process for gradually increasing magnetic energy of the inductor 14 (current flowing through the inductor 14) by the switching element Sn being turned ON and a process for gradually decreasing the magnetic energy of the inductor 14 by of the switching element Sn being turned OFF. As a result of these processes, a terminal voltage of the battery 12 is increased and applied to the smoothing capacitor 16. On the other hand, a step-down process includes a process for gradually increasing the magnetic energy of the inductor 14 (current flowing through the inductor 14) by the switching element Sp being turned ON and a process for gradually decreasing the magnetic energy of the inductor 14 by the switching element Sp being turned OFF. As a result of these processes, a charging voltage of the smoothing capacitor 16 is decreased and applied to the battery 12.

An insulated-gate bipolar transistor (IGBT) is given as an example of the switching elements Sp and Sn according to the first embodiment. Here, the IGBT provides an opening and closing function for opening and closing a current path by electronic operation. However, the direction of the current allowed in the closed state is restricted to one direction. On the other hand, the diode D# (#:p,n) provides a rectifying function that allows only a current in the direction opposite of that of the IGBT (direction from the low-potential side to the high-potential side). Therefore, the switching element S# (#:p,n) and the diode D# configure a current restricting element serving as a bi-directional current path, from one of either the high-potential side or the low-potential side to the other side, and from the other side to the one side. The switching element Sp and the diode Dp configure a "power regeneration-mode current restricting element" according to the first embodiment. The switching element Sn and the diode Dn configure a "power running-mode current restricting element" according to the first embodiment.

A control device 30 is configured by a known central processing unit (CPU), a read-only memory (ROM), a random access memory (RAM), an input/output (I/O), and the like as a control board. The control device 30 is connected to a power conversion circuit to be controlled, with an interface (not shown) therebetween. With the converter CNV as a subject to be controlled, the control device 30 performs the step-up process and the step-down process by outputting operating signals gp and gn to operate the switching elements Sp and Sn. The control device 30 basically performs the process by alternately turning ON the switching elements Sp and Sn. In other words, the control device 30 performs a process in which the converter CNV is operated by a signal that is an ON-operation instruction for either of the switching elements Sp and Sn and an OFF-operation instruction for the other, excluding the dead time DT. However, in this instance, when the direction (can be expressed by sign "+" or "−") of the current flowing through the inductor 14 is reversed during a single ON-period of the switching element Sp or the switching element Sn, power conversion efficiency decreases. This will be described hereafter with reference to FIG. 2.

As shown in FIG. 2A, as a result of the switching element Sn being turned ON and the switching element Sp being turned OFF, the voltage of the battery 12 is applied to the inductor 14. However, FIG. 2a shows that the current is flowing through the inductor 14 in the same direction as the current flowing to the battery 12 from the smoothing capacitor 16 during the period in which the switching element Sp is turned ON.

Figure 2B:
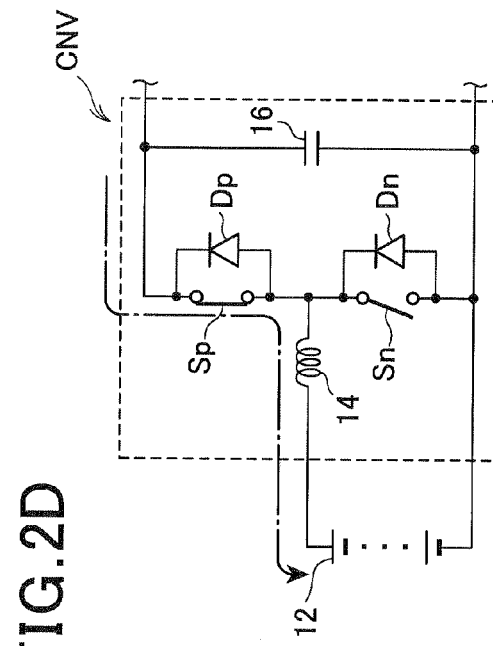

The current gradually decreases, and the direction is eventually reversed. As a result, the current flows to the switching element Sn from the battery 12 via the inductor 14, as shown in FIG. 2B. Here, the absolute value of the current flowing through the inductor 14 gradually increases, and energy is stored in the inductor 14. This is the energy storage period of the inductor 14 during power running.

Figure 2C:
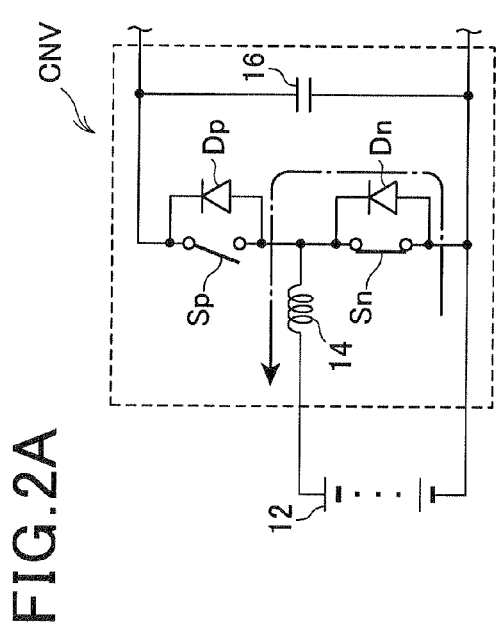

Subsequently, as a result of the switching element Sn being turned OFF and the switching element Sp being turned ON, the state is as shown in FIG. 2C. In other words, the current flows from the battery 12 to the smoothing capacitor 16. This is because the current flowing to the inductor 14 in the state shown in FIG. 2B continues flowing. Here, because the charging voltage of the smoothing capacitor 16 is greater than the terminal voltage of the battery 12, the current flowing through the inductor 14 gradually decreases.

Figure 2D:
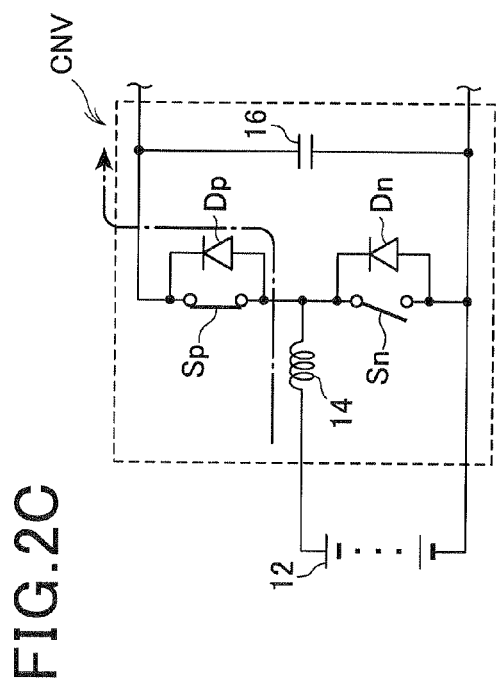

The current eventually becomes zero, and the direction is reversed. As a result, the current flows to the battery 12 from the smoothing capacitor 16 via the inductor 14, as shown in FIG. 2D. Here, the absolute value of the current flowing through the inductor 14 gradually increases, and energy is stored in the inductor 14. This is the energy storage period of the inductor 14 during regeneration.

In this way, in a state in which the direction of the current flowing through the inductor 14 is reversed, the power conversion efficiency decreases as a result of loss (refers to power loss; the same applies hereafter) in the switching elements Sp and Sn, the diodes Dp and Dn, and the inductor 14. In other words, for example, during ordinary power running in which the direction is not reversed, the current flows from the inductor 14 to the switching element Sn in the state shown in FIG. 2B, and the current flows from the inductor 14 to the diode Dp in FIG. 2C. On the other hand, during power running in which the direction of the current flowing through the inductor 14 is reversed, in addition to these current paths, the current also flows in the direction advancing from the switching element Sn to the inductor 14 as shown in FIG. 2A and the direction advancing from the switching element Sp to the inductor 14 as shown in FIG. 2D. Therefore, comparing to ordinary power running mode in which the direction is not reversed, the loss in the switching element Sn in the state shown in FIG. 2A and the loss in the switching element Sp in the state shown in FIG. 2D needlessly occur. Furthermore, needless loss also occurs as a result of the current flowing back and forth through the inductor 14.

To improve such situations, according to the first embodiment, in a state in which the direction of the current flowing through the inductor 14 is reversed, the process is switched to that in which only one of either the switching element Sp or the switching element Sn is turned ON and OFF. This will be described hereafter.

A block diagram of a process for generating operating signals g#(#=p,n,) is shown in the lower portion of FIG. 1. As shown in FIG. 1, a current IL flowing through the inductor 14 that is detected by a current sensor 22 is loaded into an average current calculating section 32. The average current calculating section 32 calculates an average current IL0 as an average value of the current IL flowing through the inductor 14 over a single ON/OFF operation cycle of the switching elements Sp and Sn. In FIG. 1, a reciprocal of the single ON/OFF operation cycle is expressed as a carrier frequency fc.

The current IL is further loaded into a peak current calculating section 34. The peak current calculating section 34 calculates an fluctuation amount (peak current Ip) of the current flowing through the inductor 14 as a difference between a minimum value ILmin and a maximum value ILmax of the current IL during a period of the single ON/OFF operation cycle "1/fc".

A mode judging section 36 receives the average current IL0 and the peak current Ip as input and selects a control mode based on the inputted average current IL0 and peak current Ip. This is performed by a process shown in FIG. 3. The process shown in FIG. 3 is repeatedly performed, for example, at a predetermined interval.

In the series of processing operations, first, at S10, the mode judging section 36 judges whether or not the absolute value of the average current IL0 is half of the peak current Ip or higher. The mode judging section 36 performs this processing operation to judge whether or not the state is that in which the direction of the current flowing through the inductor 14 is not reversed. In other words, under a premise that the changes in the current flowing through the inductor 14 are proportional to time, if the direction of the current flowing through the inductor 14 is not reversed, the absolute value of the average current IL0 is half of the peak current Ip or higher, as in the example shown in FIG. 4A. On the other hand, if the direction of the current flowing through the inverter 14 is reversed, the absolute value of the average current IL0 is lower than half of the peak current Ip, as shown in the example in FIG. 4B.

When judged "YES" at S10 in FIG. 3, the mode judging section 36 judges the state to be that in which the direction of the current flowing through the inductor 14 is not reversed. Therefore, at S12, the mode judging section 36 sets the control mode to current continuous mode.

On the other hand, when judged "NO" at S10, at S14, the mode judging section 36 judges whether or not the absolute value of the average current IL0 is a lower-limit current IL0th or lower. The mode judging section 36 performs the processing operation to judge whether or not an ON period of the switching element Sp or Sn is short and the switching element Sp or Sn cannot actually be set to an ON state. Here, the minimum amount of time that the switching element Sp or Sn is switched to the ON state is determined by the specification or the like of the switching elements Sp and Sn. In addition, the relationship between this minimum amount of time and the average current IL0 of the inductor 14 at this time varies depending on an input voltage Vin, an output voltage Vout, and the like. According to the first embodiment, the lower-limit current IL0th is a fixed value. When judged "YES" at S14, at S16, the mode judging section 36 switches the control mode to stop mode in which both switching elements Sp and Sn are kept in the OFF state.

In the other hand, when judged "NO" at S14, at S18, the mode judging section 36 judges whether or not the average current IL0 is higher than the lower-limit current IL0th. This judgment is for judging whether or not the operating state of the motor generator 10 is power running mode. Then, when being judged "YES" at S18, the mode judging section 36 judges the operating state as being power running mode. And then, at S20, the mode judging section 36 judges that the control mode being current discontinuous mode and the operating state being power running mode (then, +output appears). On the other hand, when judged "NO" at S18, at S22, the mode judging section 36 judges that the control mode as being current discontinuous mode and the operating state as being power regeneration mode (then, −output appears).

When the processing operations at S12, S16, S20, and S22 are completed, the series of processing operations are temporarily ended.

A manipulated variable calculating section 38 shown in FIG. 1 calculates a manipulated variable for controlling the voltage of the smoothing capacitor 16 (output voltage Vout of the converter CNV) to a target voltage Vref. Here, the manipulated variable calculating section 38 calculates the manipulated variable based on the input voltage Vin detected by a voltage sensor 18, the output voltage Vout detected by a voltage sensor 20, the above-described average current IL0, and the judgment result by the mode judging section 36.

Figure 5:
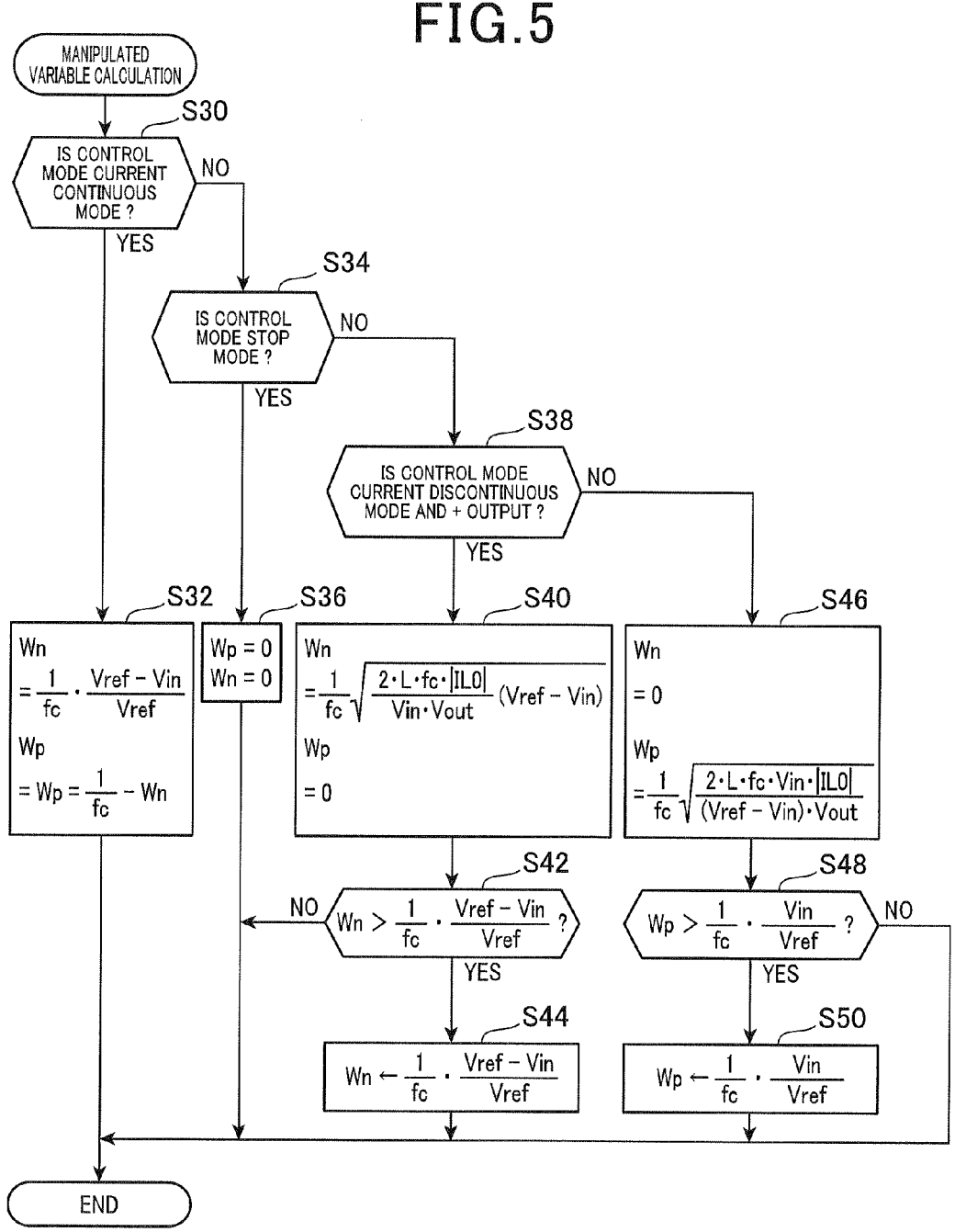
FIG. 5 is a flowchart of procedures in a process performed by a manipulated variable calculating section according to the first embodiment.

FIG. 5 shows the process performed by the manipulated variable calculating section 38. The process is repeatedly performed, for example, at a predetermined interval.

In the series of processing operations, first, at S30, the manipulated variable calculating section 38 judges whether or not the control mode is current continuous mode. When judged that the control mode is current continuous mode, at S32, the manipulated variable calculating section 38 sets an ON period Wn of the switching element Sn on the low-potential side to "(Vref−Vin)/(fc·Vref)" and sets an ON period Wp of the switching element Sp on the high-potential side to "(1/fc)−Wn". In other words, when an inductance L of the inductor 14 is used, the amount of increase in the current of the inductor 14 in the state shown in FIG. 2B is "Vin·Wn/L". The amount of decrease in the current of the inductor 14 in the state shown in FIG. 2C is "(Vref−Vin)·(1/fc−Wn)/L". Here, the expression for the ON period Wn is derived as a result of the amount of increase and the amount of decrease in the current being equal.

The processing operation at S32 configures "complementary control" according to the first embodiment.

On the other hand, when judged "NO" at S30, at S34, the manipulated variable calculating section 38 judges whether or not the control mode is stop mode. When judged that the control mode is stop mode, at S36, the manipulated variable calculating section 38 sets the ON period Wn of the switching element Sn on the low-potential side and the ON period Wp of the switching element Sp on the high-potential side to zero.

On the other hand, when judged "NO" at S34, at S38, the manipulated variable calculating section 38 judges whether or not the control mode is current discontinuous mode and the operating state is to power running. When judged "YES" at S38, the manipulated variable calculating section 38 sets the ON period Wp of the switching element Sp on the high-potential side to zero and sets the ON period Wn of the switching element Sn on the low-potential side to a value calculated by a following expression (c1). The processing operation configures "power running control" and time ratio manipulation" according to the first embodiment.

[Formula 1]

$$Wn = \sqrt{\frac{2 \cdot L \cdot |IL0|}{fc \cdot Vin \cdot Vout}(Vref - Vin)} \quad (c1)$$

Figure 6A:
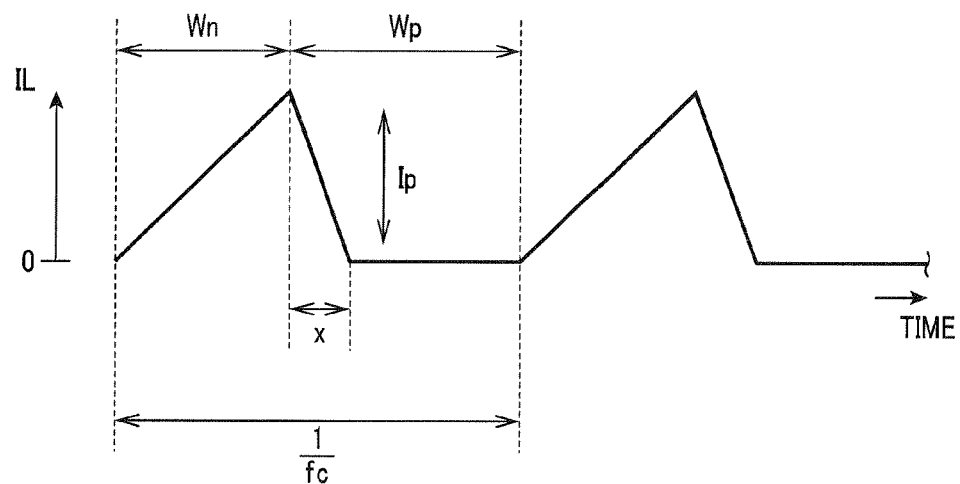
FIG. 6A and FIG. 6B are time charts for describing a manipulated variable calculating method in current discontinuous mode according to the first embodiment.

The expression (c1) is derived as follows. In other words, during the ON period Wn shown in FIG. 6A, the voltage applied to the inductor 14 is the input voltage Vin. During period x until the current flowing to through the inductor 14 gradually decreases and reaches zero, the voltage applied to the inductor 14 is "Vref−Vin". In light of the above, a following expression (c2) is established.

[Formula 2]

$$Ip = \frac{Vin \cdot Wn}{L} = \frac{(Vref - Vin) \cdot x}{L} \quad (c2)$$

Therefore, energy Ein that is inputted from the battery 12 to the converter CNV during the period of the single period "1/fc" is expressed by a following expression (c3).

[Formula 3]

$$Ein = Vin \cdot \frac{Ip}{2} \cdot (Wn + x) = \frac{(Vin \cdot Wn)^2}{2L} \cdot \frac{Vref}{Vref - Vin} \quad (c3)$$

On the other hand, output energy Eout from the converter CNV is expressed by a following expression (c4).

[Formula 4]

$$Eout = \frac{Vref \cdot |Iout|}{fc} = \frac{Vref \cdot Vin \cdot |IL0|}{fc \cdot Vout} \quad (c4)$$

However, in the expression (c4), an output current Iout from the switching element Sp and the diode Dp side to the smoothing capacitor 16 side is used. In addition, the output current Iout is substituted with the average current IL0 using an equation, "Vin·|IL0|=Vout·|Iout|" based on the law of conservation of energy established by approximation ignoring the power conversion efficiency of the converter CNV.

In the expressions (c3) and (c4), as a result of "Ein=Eout", the expression (c1) can be derived.

At subsequent S42, the manipulated variable calculating section 38 judges whether or not the calculated ON period Wn is greater than "(Vref−Vin)/(fc·Vref)". Here, "(Vref−Vin)/(fc·Vref)" is the ON period Wn when the input voltage Vin is increased to the target voltage Vref in current continuous mode. The manipulated variable calculating section 38 performs the processing operation to judge whether or not the charging rate of the inductor 14 is longer than that in current continuous mode.

Then, when judged "YES" at S42, at S44, the manipulated variable calculating section 38 sets the ON period Wn to "(Vref−Vin)/(fc·Vref)". In other words, on the ON period Wn, an upper-limit guard process is performed using the value of an occasion of current continuous mode. This process is performed in light of design in which magnetic saturation of the inductor 14 does not occur under the assumption of current continuous mode.

On the other hand, when judged "NO" at S38 (when judged that the operating state is regeneration), at S46, the manipulated variable calculating section 38 sets the ON period Wn of the switching element Sn on the low-potential side to zero and sets the ON period Wp of the switching element Sp on the high-potential side to a value calculated by a following expression (c5). The processing operation configures "power regeneration control" and "time ratio manipulation" according to the first embodiment.

[Formula 5]

$$Wp = \sqrt{\frac{2 \cdot L \cdot Vin \cdot |IL0|}{fc \cdot (Vref - Vin) \cdot Vout}} \qquad (c5)$$

Figure 6B:
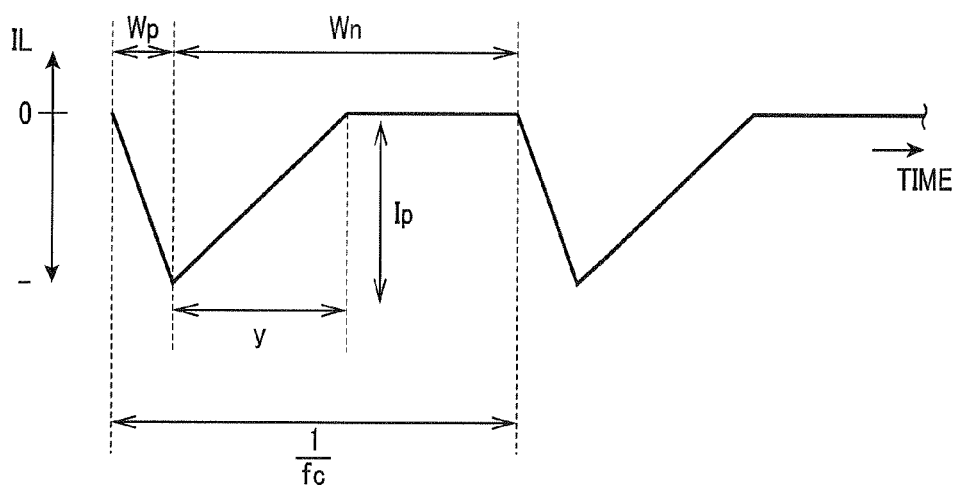

The expression (c5) is derived as follows. During the ON period Wp shown in FIG. 6B, the voltage applied to the inductor 14 is "Vref−Vin". During period y until the current flowing through the inductor 14 gradually decreases and reaches zero, the voltage applied to the inductor 14 is the input voltage Vin. In light of the above, a following expression (c6) is established.

[Formula 6]

$$Ip = \frac{(Vref - Vin) \cdot Wp}{L} = \frac{Vin \cdot y}{L} \qquad (c6)$$

Therefore, energy Ein that is inputted into the battery 12 during the period of the single period "1/fc" is expressed by a following expression (c7).

[Formula 7]

$$Ein = Vin \cdot \frac{Ip}{2} \cdot (Wp + y) \qquad (c7)$$

On the other hand, output energy Eout from the converter CNV is expressed by a following expression (c8).

[Formula 8]

$$Eout = \frac{Vref \cdot Iout}{fc} = \frac{Vref \cdot Vin \cdot |IL0|}{fc \cdot Vout} \qquad (c8)$$

In the expressions (c7) and (c8), as a result of "Ein=Eout", the expression (c5) can be derived.

At subsequent S48, the manipulated variable calculating section 38 judges whether or not the calculated ON period Wp is greater than "Vin/(fc·Vref)". Here, "Vin/(fc·Vref)" is the ON period Wp when the input voltage Vin is controlled to the target voltage Vref in current continuous mode. The manipulated variable calculating section 38 performs the processing operation to judge whether or not the charging rate of the inductor 14 is longer than that in current continuous mode.

Then, when judged "YES" at S48, at 50, the manipulated variable calculating section 38 sets the ON period Wp to "Vin/fc·Vref". In other words, on the ON period Wp, an upper-limit guard process is performed using the value of an occasion of current continuous mode. This process is performed in light of design such that a magnetic saturation of the inductor 14 does not occur under the assumption of current continuous mode.

When the processing operations at S32, S36, S44, and S50 are completed, or when the manipulated variable calculating section 38 judges "NO" at S42 or S48, the series of processing operations are temporarily ended.

An operating signal generating section 40 shown in FIG. 1 calculates the operating signals gp and gn based on the mode judgment result, and the ON periods Wn and Wp calculated by the manipulated variable calculating section 38. FIG. 7 shows a process performed by the operating signal generating section 40. The process is repeatedly performed at a predetermined interval.

In the series of processing operations, first, at S60, the operating signal generating section 40 judges whether or not the average current IL0 is zero or higher. When judged "YES" at S60, at S62, the operating signal generating section 40 sets a time ratio (Duty) to be compared in size with a triangular waveform carrier signal to "(Wn+DT)·fc" using the dead time DT. Here, because "Wn+Wp=1/fc", the time ratio in relation to the single period "1/fc" of the ON period Wn is "Wn·fc". However, according to the first embodiment, the known dead time DT is provided by a process described hereafter to prevent both switching element Sn and switching element Sp from being turned ON. Therefore, "DT·fc" is added as a feed forward term for dead time DT compensation related to the ON period Wn of the switching element Sn.

On the other hand, when judged "NO" at S60, at S64, the operating signal generating section 40 sets the time ratio to "{(1/fc)−Wp−DT}·fc". Here, in current continuous mode, "(1/fc)−Wp" is equal to the ON period Wn. Notwithstanding, the time ratio is defined using the ON period Wp when the operating signal generating section 40 judges "NO" at S60 (during regeneration) because, in current discontinuous mode, the ON period Wn during regeneration is zero, and "Wn+Wp=1/fc" is not established. "−DT·fc" is a feed forward term for dead time DT compensation related to the ON period Wp of the switching element Sp.

When the processing operations at S62 and S64 are completed, at S66, the operating signal generating section 40 judges whether or not the timing is that for transitioning from a state in which the time ratio is the carrier or greater, to a state in which the time ratio is less than the carrier. Here, the carrier is a triangular wave signal of which the period is "1/fc" and the fluctuation width is standardized to "1". Then, when judged "YES" at S66, at S68, the operating signal generating section 40 turns OFF the switching element Sn. The operating signal generating section 40 then waits for the elapse of the dead time DT (S70), and turns ON the switching element Sp under a condition that a logical conjunction of the control mode being current discontinuous mode and the operating state being power running is "false".

Then, at S76, the operating signal generating section 40 judges whether or not the timing is that for transitioning from the state in which the time ratio is less than the carrier to the state in which the time ratio is the carrier or greater. When judged "YES" at S76, at S78, the operating signal generating section 40 turns OFF the switching element Sp. Subsequently, the operating signal generating section 40 waits for the elapse of the dead time DT (S80), and turns ON the switching element Sn under a condition that a logical product of the control mode being current discontinuous mode and the operating state being regeneration is false. When the processing operation at S84 is completed, or when the operating signal generating section 40 judges "YES" at S82, the series of processing operations is temporarily ended.

Figure 8B:
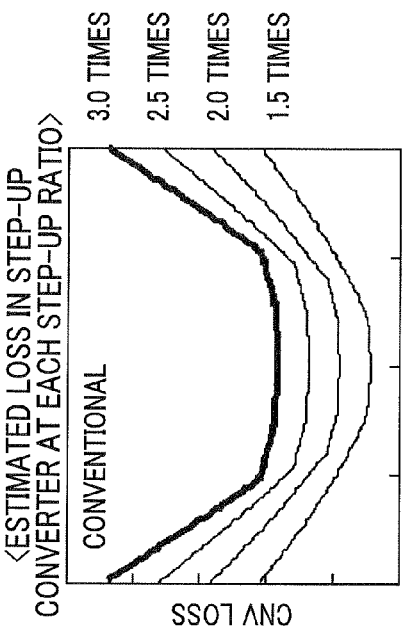
FIG. 8A to FIG. 8C are diagrams of effects according to the first embodiment.
Figure 8C:
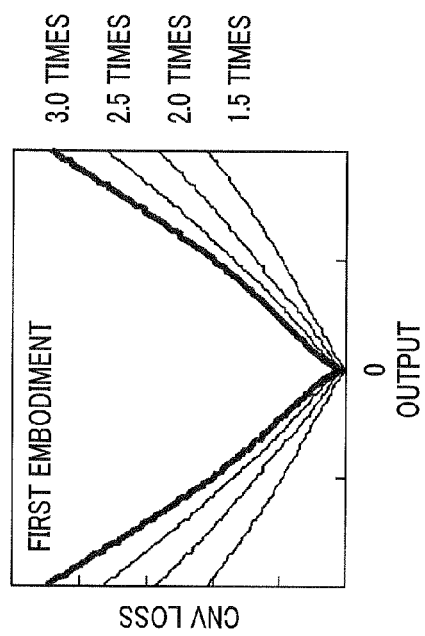
Figure 8A:
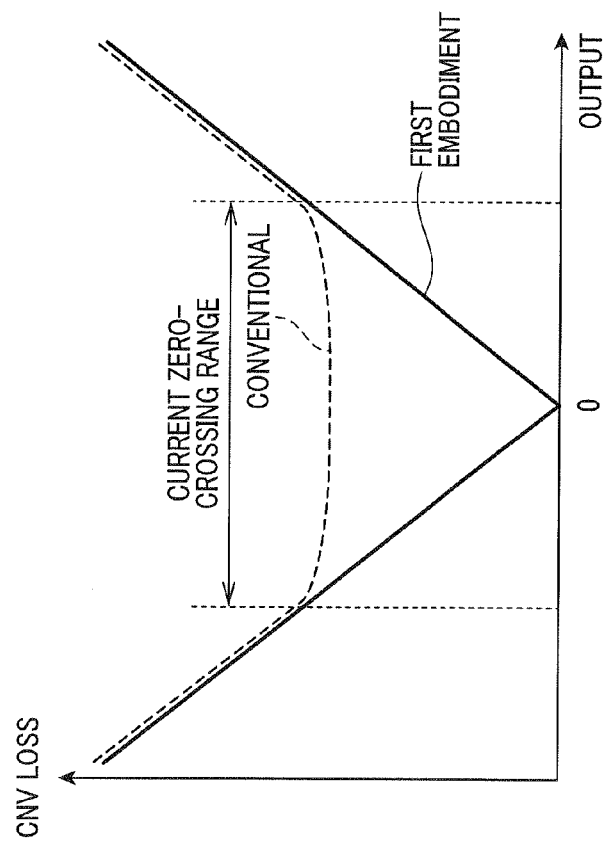

FIG. 8A to FIG. 8C show the effects according to the first embodiment. As shown in FIG. 8A, according to the first embodiment, loss approaches zero as a result of the output (power) of the converter CNV approaching zero. On the other hand, in an instance in which only a process for alternately turning ON and OFF the switching elements Sp and Sn is performed (conventional in FIG. 8A), the loss becomes substantially constant in the range where the output of the converter CNV is near zero. FIG. 8B and FIG. 8C show the loss for each step-up ratio in the conventional example and that according to the present embodiment.

As described above, according to the first embodiment, loss can be reduced. This is because, in addition to loss being reduced as described with reference to FIG. 2, when the input voltage Vin and the target voltage Vref are the same, the charging rate of the inductor 14 becomes shorter compared to when the switching elements Sp and Sn are alternately turned ON and OFF. Here, the charging period can be shortened because needless energy is not required to be collected for prohibiting reverse of the direction of the current of the inductor 14.

In a state in which the direction of the current flowing to the inductor 14 is not reversed, controllability of the output voltage Vout can be improved as a result of the switching elements Sp and Sn being alternately turned ON. In other words, for example, during power running, when power consumption on the inverter INV side suddenly decreases, the current flows from the smoothing capacitor 16 to the battery 12 via the switching element Sp. As a result, the operating state becomes the regeneration state. A situation in which the voltage of the smoothing capacitor 16 excessively exceeds the target voltage Vref can be avoided.

Second Embodiment

A second embodiment will hereinafter be described with reference to the drawings, mainly focusing on the differences with the above-described first embodiment. FIG. 9 shows a system configuration according to the second embodiment. Components and processes in FIG. 9 corresponding to those in FIG. 1 are given the same reference numbers for convenience.

According to the second embodiment, in current discontinuous mode, the manipulated variable calculating section 38 calculates a manipulated variable using a pulse-frequency modulation (PFM) process. In other words, during power-running, the ON period Wn is set to a fixed value that is greater than zero, and the ON/OFF operation cycle "1/fc" of the switching element Sn is the manipulated variable. During regeneration, the ON period Wp is set to a fixed value greater than zero, and the ON/OFF operation cycle "1/fc" of the switching element Sp is the manipulated variable.

Figure 10:
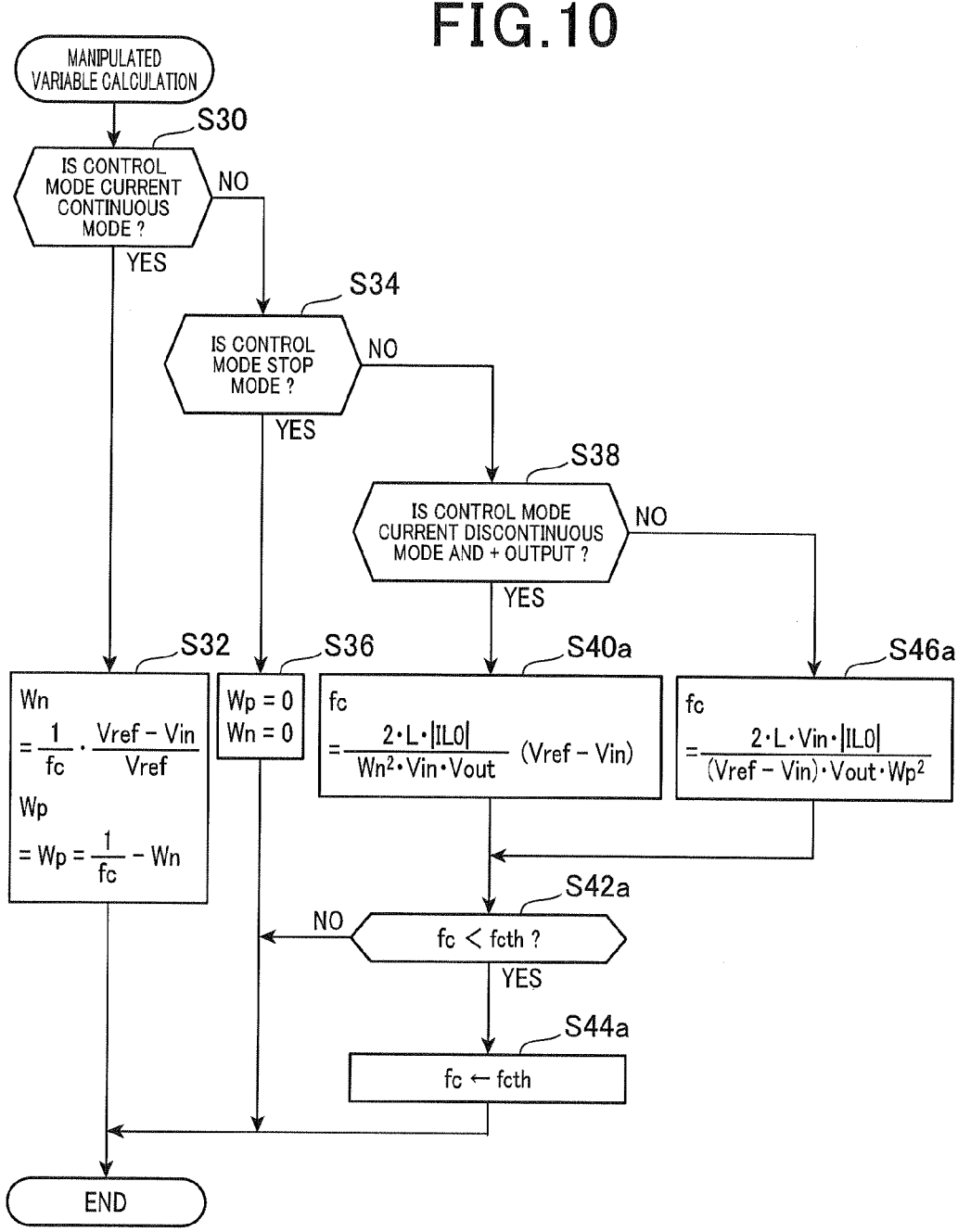
FIG. 10 is a flowchart of procedures in a process performed by a manipulated variable calculating section according to the second embodiment.

FIG. 10 shows a process performed by the manipulated variable calculating section 38 according to the second embodiment. The process is repeatedly performed, for example, at a predetermined interval. Processing operations in FIG. 10 corresponding to those in FIG. 5 are given the same step numbers for convenience.

In the series of processing operations, when judged "YES" at S38, at S40a, the manipulated variable calculating section 38 calculates the frequency fc that is the reciprocal of the ON/OFF operation cycle of the switching element Sn by a following expression (c9). The processing operation configures "power-running control" and "frequency manipulation" according to the second embodiment.

[Formula 9]

$$fc = \frac{2 \cdot L \cdot |IL0|}{Wn^2 \cdot Vin \cdot Vout}(Vref - Vin) \quad (c9)$$

The expression is obtained by solving the expression (c1) for the frequency fc.

On the other hand, when judged "NO" at S38, at S46a, the manipulated variable calculating section 38 calculates the frequency fc that is the reciprocal of the ON/OFF operation cycle of the switching element Sp by a following expression (c10). The processing operation configures "power regeneration control" and "frequency manipulation" according to the second embodiment.

[Formula 10]

$$fc = \frac{2 \cdot L \cdot Vin \cdot |IL0|}{(Vref - Vin) \cdot Vout \cdot Wp^2} \quad (c10)$$

The expression is obtained by solving the expression (c5) for the frequency fc.

When the processing operations at S40a and S46a are completed, at 42a, the manipulated variable calculating section 38 judges whether or not the frequency fc is a lower frequency than a prescribed frequency fcth. The manipulated variable calculating section 38 performs the processing operation to judge whether or not the frequency fcth is an excessively low frequency. When judged "YES" at S42a, at S44a, the manipulated variable calculating section 38 sets the frequency fc to the prescribed frequency fcth. In other words, the manipulated variable calculating section 38 performs a guard process to set the prescribed frequency fcth as the lower-limit guard value. This is to prevent a situation in which noise that is easily detected by humans occurs.

According to the second embodiment described above, in current discontinuous mode, the switching frequency per unit time can be reduced as a result of PFM being performed. Therefore, the effect of reducing loss can be enhanced.

Third Embodiment

A third embodiment will hereinafter be described with reference to the drawings, mainly focusing on the differences with the above-described first embodiment.

According to the above-described first embodiment, in a state in which the direction of the current flowing through the inductor 14 is reversed, power conversion loss is reduced as a result of the process being switched to that in which only the switching element Sp or the switching element Sn is turned ON and OFF. Here, during low output (low input) in which the current flowing through the inductor 14 is small, although the output fluctuation on the inverter INV side is also small, the loss of automatic adjustment function for the output voltage caused by the switching elements Sp and Sn being alternately turned ON remains unchanged.

Therefore, according to the third embodiment, some of the processing operations in current discontinuous mode are modified to improve responsiveness to load fluctuations.

Figure 11:
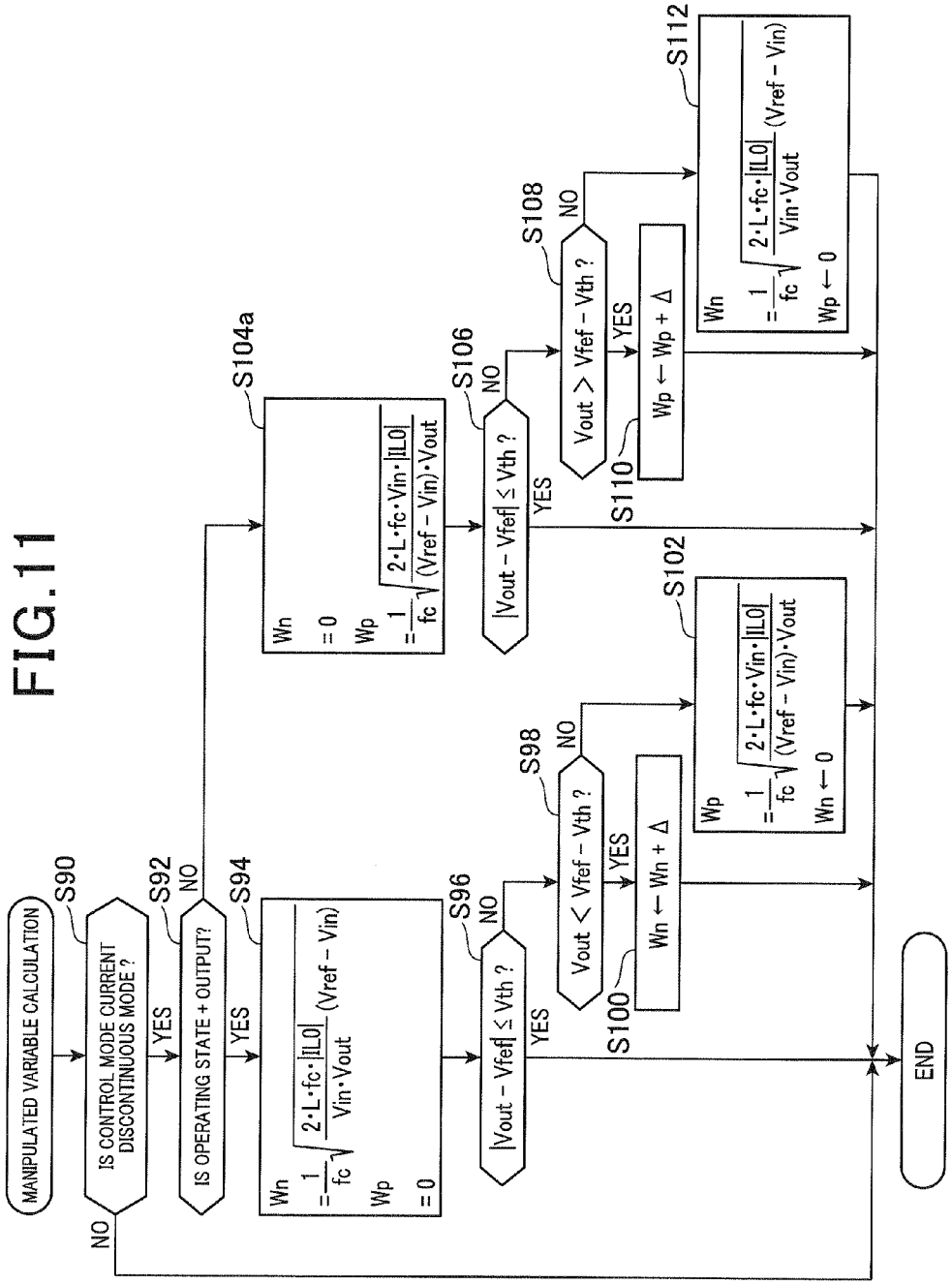
FIG. 11 is a flowchart of procedures in a process performed by a manipulated variable calculating section according to a third embodiment.

FIG. 11 shows a process performed by the manipulated variable calculating section 38 according to the third embodiment. The process is repeatedly performed, for example, at a predetermined interval in current discontinuous mode. Processing operations in FIG. 10 that correspond with those in FIG. 5 are given the same step numbers for convenience.

In the series of processing operations, first, at S90, the manipulated variable calculating section 38 judges whether or not the control mode is current discontinuous mode. When judged "YES" at S90, at S92, the manipulated variable calculating section 38 judges whether or not the operating state is power running. When judged that the operating state is power running, at S94, the manipulated variable calculating section 38 performs the processing operation at S40 in FIG. 5. At subsequent S96, the manipulated variable calculating section 38 judges whether or not the absolute value of the difference between the output voltage Vout and the reference voltage Vref is a prescribed differential voltage Vth or lower. The manipulated variable calculating section 38 performs the processing operation to judge whether or not the controllability of the output voltage Vout is in a reduced state because of load fluctuation or the like. When judged "NO" at S96, then at S98 the manipulated variable calculating section 38 judges whether or not the output voltage Vout is lower than the target voltage Vref by the prescribed differential voltage Vth or more. The manipulated variable calculating section 38 performs the processing operation to judge whether or not the ON/OFF operation of the switching element Sn is unsuitable in terms of recovering the controllability of the output voltage Vout.

When judged "YES" at S98, it can be considered possible to quickly recover controllability of the output voltage Vout by ON/OFF operation of the switching element Sn. Therefore, the manipulated variable calculating section 38 proceeds to S100 and corrects the ON period Wn to be increased by a prescribed amount Δ. The manipulated variable calculating section 38 performs the processing operation to extend the charging rate of the inductor 14. Here, the prescribed amount Δ is a feedback manipulated variable.

On the other hand, when judged "NO" at S98, it can be considered difficult to quickly recover controllability of the output voltage Vout by ON/OFF operation of the switching element Sn. Therefore, at S102, the manipulated variable calculating section 38 switches control to power regeneration control. Here, the manipulated variable calculating section 38 calculates the ON period Wp of the switching element Sp using the above-described expression (c5), with the ON period Wn of the switching element Sn set to zero. The processing operation at S102 configures a "transition response process" according to the third embodiment.

On the other hand, when judged "NO" at S92, at S104, the manipulated variable calculating section 38 performs a processing operation similar to that at S46 in FIG. 5. At subsequent S106, the manipulated variable calculating section 38 judges whether or not the absolute value of the difference between the output voltage Vout and the target voltage Vref is the prescribed differential voltage Vth or less. The manipulated variable calculating section 38 performs the processing operation to judge whether or not the controllability of the output voltage Vout is in a reduced state because of load fluctuation or the like. When judged "NO" at S106, at S108, the manipulated variable calculating section 38 judges whether or not the output voltage Vout is higher than the target voltage Vref by the prescribed differential voltage Vth or more. The manipulated variable calculating section 38 performs the processing operation to judge whether or not the ON/OFF operation of the switching element Sp is unsuitable in terms of recovering the controllability of the output voltage Vout.

When judged "YES" at S108, it can be considered possible to quickly recover controllability of the output voltage Vout by ON/OFF operation of the switching element Sp. Therefore, the manipulated variable calculating section 38 proceeds to S110 and corrects the ON period Wp to be increased by the prescribed amount Δ. The manipulated variable calculating section 38 performs the processing operation to extend the charging rate of the inductor 14. Here, the prescribed amount Δ is a feedback manipulated variable.

On the other hand, when judged "NO" at S108, it can be considered difficult to quickly recover controllability of the output voltage Vout by ON/OFF operation of the switching element Sp. Therefore, at S112, the manipulated variable calculating section 38 switches control to power running control. Here, the manipulated variable calculating section 38 calculates the ON period Wn of the switching element Sn using the above-described expression (c1), with the ON period Wp of the switching element Sp set to zero. The processing operation at S112 configures a "transition response process" according to the third embodiment.

When the processing operations at S100, S102, S110, and S112 are completed, or when the manipulated variable calculating section 38 judges "NO" at S90, or "YES" at S96 or S106, the series of processing operations is temporarily ended.

Fourth Embodiment

A fourth embodiment will hereinafter be described with reference to the drawings, mainly focusing on the differences with the above-described third embodiment. According to the fourth embodiment, a measure against load fluctuation similar to that according to the third embodiment is taken when PFM processing is performed in current discontinuous mode.

Figure 12:
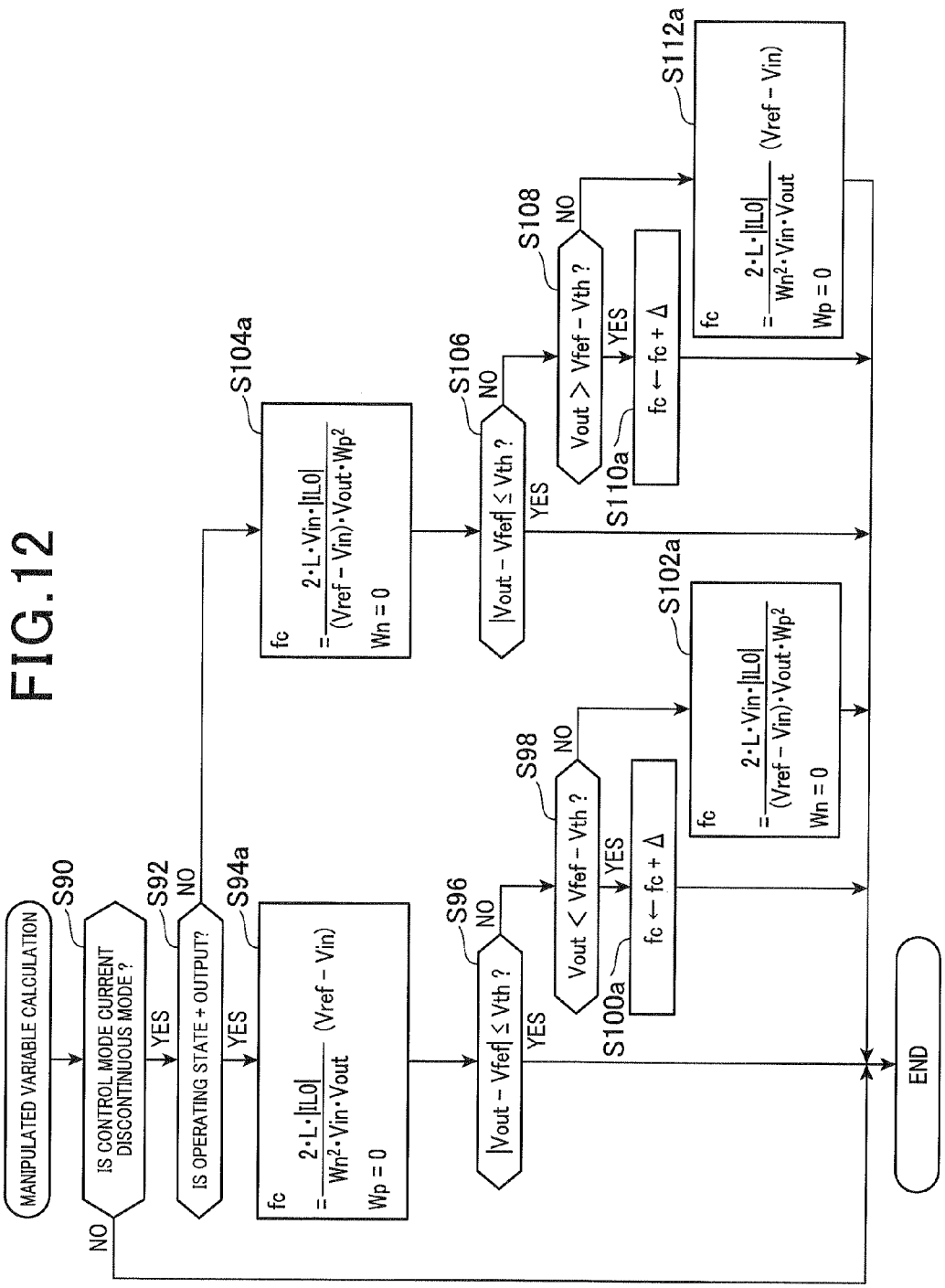
FIG. 12 is a flowchart of procedures in a process performed by a manipulated variable calculating section according to a fourth embodiment.

FIG. 12 shows a process performed by the manipulated variable calculating section 38 according to the fourth embodiment. The process is repeatedly performed, for example, at a predetermined interval in current discontinuous mode. Processing operations in FIG. 12 that correspond with those in FIG. 11 are given the same step numbers for convenience.

As shown in FIG. 12, according to the fourth embodiment, depending on whether or not the manipulated variable calculating section 38 judges "YES" at S92, the processing operation at above-described S40a in FIG. 10 is performed at S94a or the processing operation at above-described S46a in FIG. 10 is performed at S104a.

When judged "YES" at S98, at S100a, the manipulated variable calculating section 38 corrects the frequency fc to be increased by the prescribed amount Δ. The manipulated variable calculating section 38 performs the processing operation to shorten the ON/OFF cycle of the switching element Sn, thereby increasing the charging rate of the inductor 14. Here, the prescribed amount Δ is a feedback manipulated variable. On the other hand, when judged "NO" at S98, at S102a, the manipulated variable calculating section 38 switches the frequency fc to that calculated at above-described S104a (during regeneration).

Furthermore, when judged "YES" at S108, at S110a, the manipulated variable calculating section 38 corrects the frequency fc to be increased by the prescribed amount Δ. The manipulated variable calculating section 38 performs the processing operation to shorten the ON/OFF cycle of the switching element Sp, thereby increasing the charging rate of the inductor 14. Here, the prescribed amount Δ is a feedback manipulated variable. On the other hand, when judged "NO" at S108, at S112a, the manipulated variable calculating section 38 switches the frequency fc to that calculated at above-described S94a (during power running).

Fifth Embodiment

A fifth embodiment will hereinafter be described with reference to the drawings, mainly focusing on the differences with the above-described first embodiment.

As described according to the third embodiment, in current discontinuous mode, controllability (responsiveness) of the output voltage Vout may decrease. Therefore, according to the fifth embodiment, switching the control mode to current discontinuous mode is prohibited under predetermined conditions, even in a state in which the direction of the current flowing through the inductor 14 is reversed.

Figure 13:
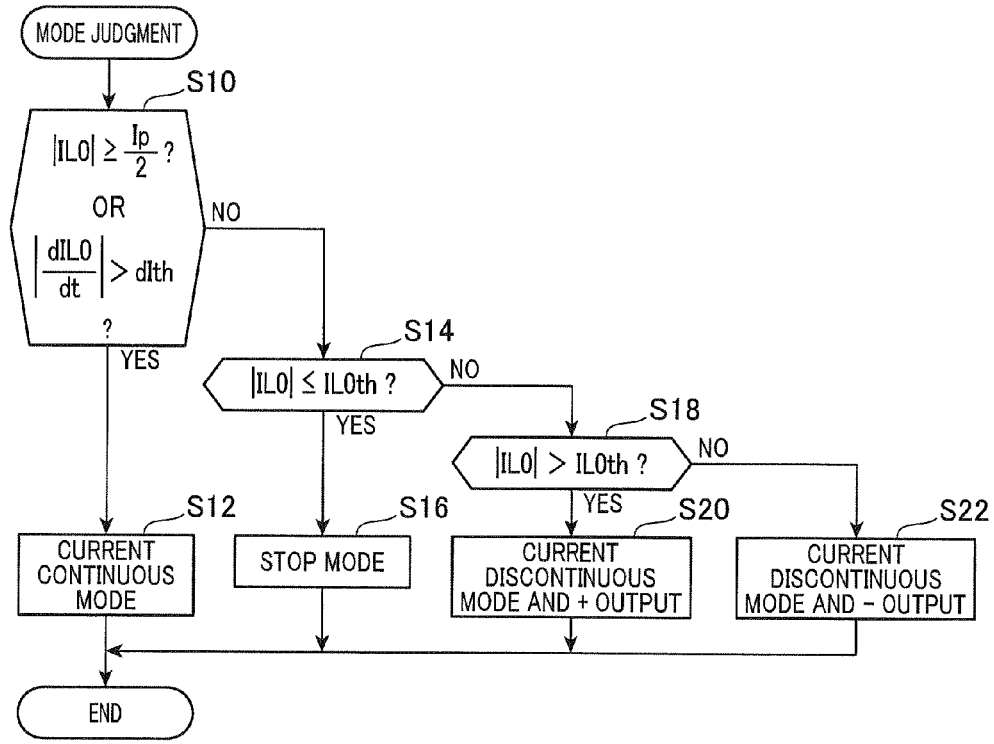
FIG. 13 is a flowchart of procedures in a process performed by a mode judging section according to a fifth embodiment.

FIG. 13 shows the procedures in a process performed by the mode judging section 36 according to the fifth embodiment. The process is repeatedly performed, for example, at a predetermined interval. Processing operations in FIG. 13 corresponding to those in FIG. 3 are given the same step numbers for convenience.

In the series of processing operations, at S10a that is a judgment processing operation for judging whether or not to set the control mode to current continuous mode, regarding a pair of conditions in that the absolute value of the average current IL0 is half of the peak current Ip or higher and the absolute value of the fluctuation speed of the average current IL0 is higher than a threshold speed dIth, the mode judging section 36 judges whether or not the logical sum of the pair of conditions is true. In other words, when the absolute value of the fluctuation speed of the average current IL0 is greater than the threshold speed dIth, the mode judging section 36 determines the control mode to be current continuous mode from the perspective of ensuring responsiveness of control. The processing operation configures "prohibition of switching to current discontinuous mode" according to the fifth embodiment.

Figure 14:
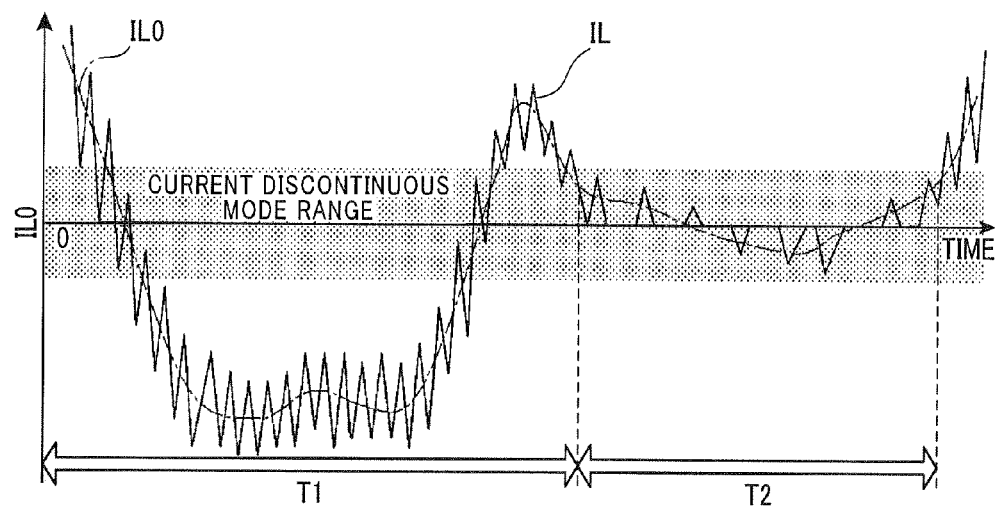
FIG. 14 is a time chart of a power conversion process according to the fifth embodiment.

FIG. 14 shows an example of switching between current continuous mode and discontinuous mode according to the fifth embodiment. As shown in FIG. 14, during period T1 in which the fluctuation speed of the absolute value of the average current IL0 is high, current continuous mode is used even in the range of the average current IL0 in which current discontinuous mode can be applied. On the other hand, during period T2 in which the fluctuation speed of the absolute value of the average current IL0 is low, current discontinuous mode is used in the range of the average current IL0 in which the current discontinuous mode can be applied. As a result, reversal of the current flowing through the inductor 14 can be prevented, and power conversion loss can be reduced.

Sixth Embodiment

A sixth embodiment will hereinafter be described with reference to the drawings, mainly focusing on the differences with the above-described first embodiment.

FIG. 15 shows a system configuration according to the sixth embodiment. Components and processes in FIG. 15 corresponding to those in FIG. 1 are given the same reference numbers for convenience.

According to the sixth embodiment, instead of the current sensor 22 for detecting the current flowing through the inductor 14 being included, a current sensor 22a is included that detects a current (load current Iload) outputted from the converter CNV to the outside.

In addition, according to the sixth embodiment, whether or not the direction of the current flowing through the inductor 14 is reversed by use of the current continuous mode is predicted, and the mode judgment process is performed based on the predicted result.

In other words, an average current calculating section 32a predicts an average current IL0 at the target voltage Vref, based on the input voltage Vin, the output voltage Vout, and the load current Iload. This is calculated by a following expression (C11) using a capacitance C of the smoothing capacitor 16.

[Formula 11]

$$IL0 = \frac{Vout}{Vin}\left\{Iload + \frac{C}{Ts} \cdot (Vref - Vout)\right\} \quad (c11)$$

Here, an update period Ts is an update cycle of the target voltage Vref. The update period Ts is set to an amount of time longer than "1/fc". In particular, the update period Ts is set to a value that is N (N>2) times "1/fc". This is to set the average current IL0 to a predicted value of an instance in which a process for filling the inductor 14 with energy and a process for discharging energy from the inductor 14 are repeatedly performed a plurality of times.

Here, the output current Tout from the switching element Sp and diode Dp side to the smoothing capacitor 16 side becoming "Iload+C·(Vref−Vout)/Ts" is used. In other words, the current flowing into the smoothing capacitor 16 during the update period Ts is "C·(Vref−Vout)/Ts". As described above, "IL0·Vin=Vout·Iout".

On the other hand, a peak current calculating section 34a predicts the peak current Ip at the target voltage Vref in current continuous mode, based on the target voltage Vref and the input voltage Vin. This is calculated by a following expression (C12).

[Formula 12]

$$Ip = \frac{Vin \cdot (Vref - Vin)}{L \cdot fc \cdot Vref} \quad (c12)$$

As a result of the average current IL0 and the peak current Ip being set to predicted values in this way, the mode judging section 36 can predict whether or not the direction of the current flowing through the inductor 14 is reversed as a result of current continuous mode being used. The process configures "reverse prediction" according to the sixth embodiment. Based on the predicted result, the mode judging to section 36 can decide whether or not to set the control mode to current discontinuous mode.

Furthermore, at this time, when the control mode is set to current continuous mode, whether power running control or power regeneration control is performed can also be predicted. Therefore, in a case where the control mode is set to current discontinuous mode, the question concerning which is more suitable of the switching elements Sp or Sn as a subject to be operated to achieve the target voltage Vref can be predicted based on the current input voltage Vin and target voltage Vref rather than based on whether the last performed mode was power running control or power regeneration control. The process for determining concerning which perform power running control or power regeneration control configures "mode determination" according to the sixth embodiment.

As described above, according to the sixth embodiment, as a result of "prediction regarding whether or not the direction of the current is reversed" and "mode determination" being performed, responsiveness of control regarding load fluctuation and the like can be enhanced.

Seventh Embodiment

A seventh embodiment will hereinafter be described with reference to the drawings, mainly focusing on the differences with the above-described sixth embodiment. According to the seventh embodiment, the method by which the average current calculating section 32a calculates the average current IL0 is modified.

Figure 16:
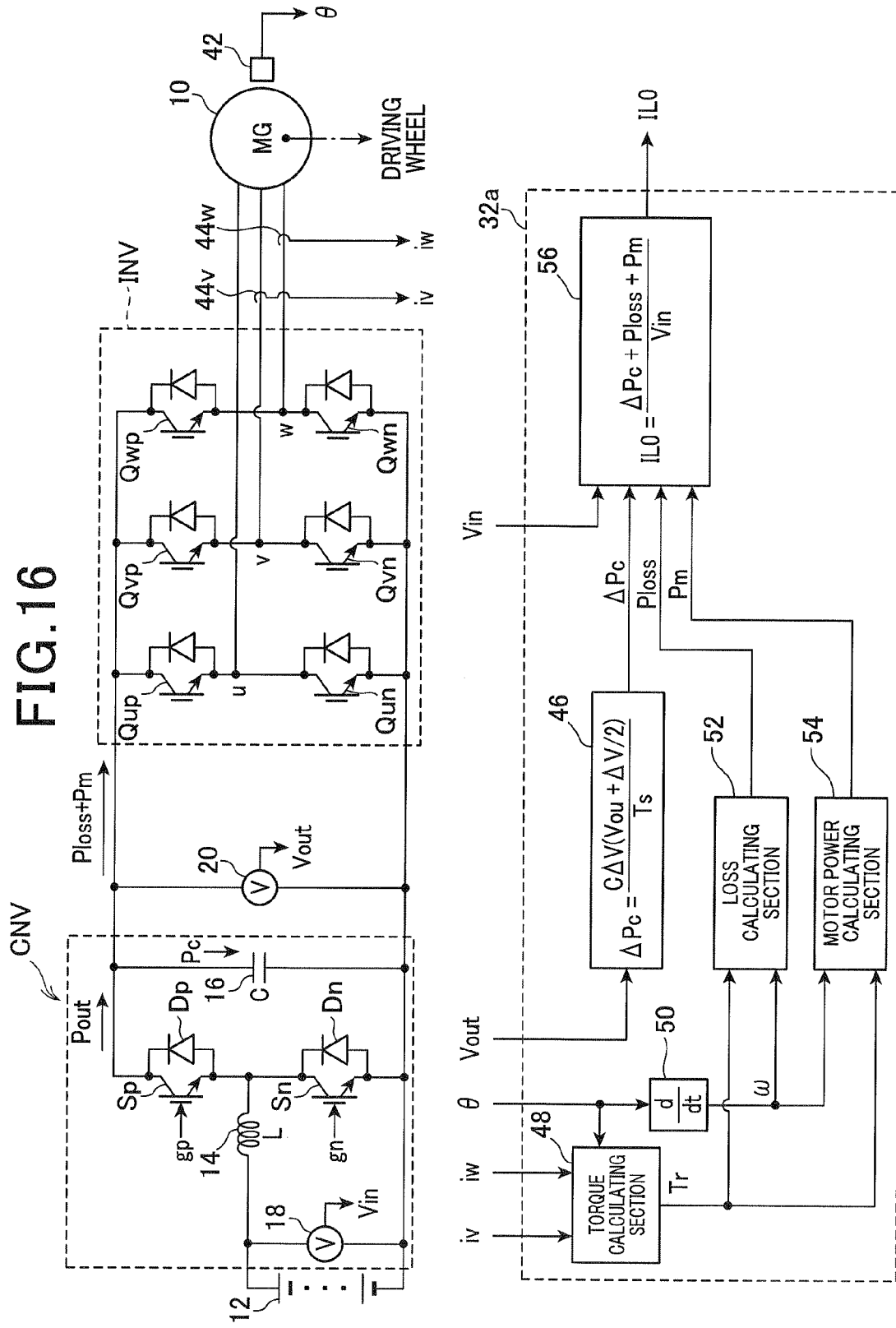
FIG. 16 is a diagram of a system configuration according to a seventh embodiment.

FIG. 16 shows a system configuration according to the seventh embodiment. Components and processes in FIG. 16 that correspond with those shown in FIG. 15 are given the same reference numbers for convenience. In FIG. 16, processing sections in the control device 30 other than the average current calculating section 32a are omitted.

As shown in FIG. 16, the inverter INV includes three sets of serially connected members composed of switching elements Q¥ p and Q¥ n (¥ Y=u,v,w). The respective connection points of the serially connected members are respectively connected to the U-phase, the V-phase, and the W-phase of the motor generator 10. The motor generator 10 is a rotating electrical body. According to the seventh embodiment, IGBT are used as the switching elements Q¥ #(#=p,n). In addition, each switching element Q#¥ is connected in inverse parallel with a freewheeling diode. Still further, according to the seventh embodiment, a three-phase permanent magnet synchronous motor is used as the motor generator 10.

A rotation angle sensor 42 (such as a resolver) is provided near the motor generator 10. The rotation angle sensor 42 detects a rotation angle θ (electrical angle) of the motor generator 10. Current sensors 44v and 44w are provided on an electrical path connecting between the inverter INV and the motor generator 10. The current sensors 44v and 44w detect a V-phase current and a W-phase current respectively flowing through the V-phase and the W-phase of the motor generator 10. Here, for example, sensors including a current transistor or a resistor can be used as the current sensors 44v and 44w. According to the seventh embodiment, the current sensor 22a is not included.

Next, a process performed by the average current calculating section 32a according to the seventh embodiment will be described.

A change amount calculating section 46 calculates an amount of change in input/output power Pc of the smoothing capacitor 16 (referred to, hereinafter, as a power change amount ΔPc of the smoothing capacitor 16), based on the output voltage Vout. This is calculated by a following expression (c13) using the capacitance C of the smoothing capacitor 16, the update period Ts, and a change amount ΔV of the output voltage Vout during a period from a predetermined timing to the timing at which the update period Ts has elapsed.

[Formula 13]

$$\Delta Pc = \frac{C}{2Ts}\{(Vout + \Delta V)^2 - Vout^2\} = \frac{C\Delta V(Vout + \Delta V/2)}{Ts} \quad (c13)$$

In the above-described expression (C13), the power change amount ΔPc of the smoothing capacitor 16 is a positive value when the smoothing capacitor 16 is charged and a negative value when the smoothing capacitor 16 is discharged.

A torque calculating section 48 calculates an output torque Tr of the motor generator 10 based on a V-phase current iv and a W-phase current iw detected by the current sensors 44v and 44w, and the rotation angle θ detected by the rotation angle sensor 42. Here, specifically, for example, a d-axis current and a q-axis current that are currents of a rotation coordinate system are calculated based on the V-phase current iv, the W-phase current iw, and the rotation angle θ. The output torque Tr is then calculated based on the calculated d-axis current and q-axis current.

A speed calculating section 50 calculates a rotation speed ω of the motor generator 10 as a differential operator of the rotation angle θ

A loss calculating section 52 calculates a total loss Ploss (>0) that is a total value of the loss in the inverter INV and the loss in the motor generator 10 based on the output torque Tr and the rotation angle speed ω. Specifically, for example, the total loss Ploss can be calculated with the output torque Tr and the rotation angle speed ω as inputs and using a map in which the output torque Tr and the rotation angle speed ω are associated with the total loss Ploss.

A motor power calculating section 54 calculates a motor power Pm as a product of the output torque Tr and the rotation angle speed ω of the motor generator 10. The motor power Pm is equivalent to the input/output power of the motor generator 10. The motor power Pm is a positive value during power running of the motor generator 10 and a negative value during regeneration.

A current calculating section 56 calculates the average current IL0 based on the input voltage Vin, the power change amount ΔPc, the total loss Ploss, and the motor power Pm. This is calculated by a following expression (C14).

[Formula 14]

$$IL0 = \frac{Pout}{Vin} = \frac{\Delta Pc + Ploss + Pm}{Vin} \quad (c14)$$

When the expression (c14) is derived, the loss in the converter CNV is ignored. In addition, in the expression (c14), "Pout" is the power passing through the switching element Sp or the diode Dp configuring the power regeneration-mode current restricting element. The power in the direction from the power regeneration-mode current restricting element to the smoothing capacitor 16 side is positive. In other words, when the motor generator 10 is operating in power running mode, power is supplied from the inductor 14 side to the smoothing capacitor 10 side via the diode Dp. "Pout" becomes a positive value. On the other hand, when the motor generator 10 is operating in power regeneration mode, power is supplied from the smoothing capacitor 16 side to the inductor 14 side via the switching element Sp. "Pout" becomes a negative value.

In this way, according to the seventh embodiment, the average current IL0 can be calculated without using a detected value from the current sensor 22a.

Variation Examples

The following modifications can be made in each of the to above-described embodiments.
(Regarding Complementary Control)

Complementary control is not limited to that in which the time ratio D of the ON period in relation to a single ON/OFF cycle of the switching element Sn is the manipulated variable. The ON period may be fixed, and the length of a single period may be the manipulated variable.

Complementary control is not limited to feed forward control in which the feed forward manipulated variable for controlling the output voltage Vout to the target voltage Vref is calculated, and the switching elements Sp and Sn are operated based on the calculated feed forward manipulated variable. For example, feedback control may be performed in which a manipulated variable is calculated for performing feedback control of the output voltage Vout to the target voltage Vref, and the switching elements Sp and Sn are operated based on the calculated manipulated variable. In addition, the switching elements Sp and Sn may be operated based on a sum of the feed forward manipulated variable and the feedback manipulated variable.

Complementary control is not limited to that in which the output voltage Vout is the controlled variable. For example, the output voltage Vout and the output current Tout may be the controlled variables. In this instance, for example, the smaller of the time ratio D of the ON period in relation to the single ON/OFF operation cycle of the switching element Sn serving as the manipulated variable for controlling the output voltage Vout to the target voltage Vref and the time ratio D for controlling the output current Iout to a target current can be the actual time ratio D.

(Regarding Power Running Control)

According to the above-described first embodiment (FIG. 5), power running control is feed forward control in which the feed forward manipulated variable for controlling the output voltage Vout to the target voltage Vref is calculated, and the switching element Sn is operated based on the calculated manipulated variable. However, power running control is not limited thereto. For example, power running control may be feedback control in which the manipulated variable is calculated for performing feedback control of the output voltage Vout to the target voltage Vref, and the switching element Sn is operated based on the calculated manipulated variable. In addition, the switching element Sn may be operated based on the sum of the feed forward manipulated variable and the feedback manipulated variable. This indicates that feedback control can be used even when the transition response process is not performed.

Power running control is not limited to that in which the output voltage Vout is the controlled variable. For example, the output voltage Vout and the output current Iout may be the controlled variables. In this instance, for example, the smaller of the time ratio D of the ON period in relation to the single ON/OFF operation cycle of the switching element Sn serving as the manipulated variable for controlling the output voltage Vout to the target voltage Vref and the time ratio D for controlling the output current Tout to a target current can be the actual time ratio D.

In addition, the manipulated variable is not limited to either of the time ratio D and the frequency fc. Both may be manipulated variables. In other words, both time ratio manipulation and frequency manipulation may be performed.

(Regarding Power Regeneration Control)

According to the above-described first embodiment (FIG. 5), power regeneration control is feed forward control in which the feed forward manipulated variable for controlling the output voltage Vout to the target voltage Vref is calculated, and the switching element Sp is operated based on the calculated manipulated variable. However, power regeneration control is not limited thereto. For example, power regeneration control may be feedback control in which the manipulated variable is calculated for performing feedback control of the output voltage Vout to the target voltage Vref, and the switching element Sp is operated based on the calculated manipulated variable. In addition, the switching element Sp may be operated based on the sum of the feed forward manipulated variable and the feedback manipulated variable. This indicates that feedback control can be used even when the transition response process is not performed.

Power regeneration control is not limited to that in which the output voltage Vout is the controlled variable. For example, the output voltage Vout and the output current Tout may be the controlled variables. In this instance, for example, the smaller of the time ratio D of the ON period in relation to the single ON/OFF operation cycle of the switching element Sp serving as the manipulated variable for controlling the output voltage Vout to the target voltage Vref and the time ratio D for controlling the output current Tout to a target current can be the actual time ratio D.

When the output current is the controlled variable in "power regeneration control", "complementary control", and "power running control", the average current $IL0$ calculated by the expression (c14) according to the seventh embodiment may be the target current. At this time, a manipulated variable may be calculated for performing feedback control of the current detected by the current sensor 22 or the average current $IL0$ calculated by the expression (c11) according to the sixth embodiment to the above-described target current, and the switching element S# may be operated based on the calculated manipulated variable.

In addition, the manipulated variable is not limited to either of the time ratio D and the frequency fc. Both may be manipulated variables. In other words, both time ratio manipulation and frequency manipulation may be performed.

(Regarding Transition Response Process)

According to the above-described third embodiment (FIG. 11) and fourth embodiment (FIG. 12), when power running control is switched to power regeneration control, power regeneration control is configured as feed forward control. However, this is not limited thereto. As described in "Regarding power regeneration control", feedback control may be performed as well.

According to the above-described third embodiment (FIG. 11) and fourth embodiment (FIG. 12), when power regeneration control is switched to power running control, power running control is configured as feed forward control. However, this is not limited thereto. As described in "Regarding power running control", feedback control may be performed as well.

(Regarding Guard Process)

According to the above-described first embodiment (FIG. 5), the upper-limit value of the time ratio during energy charging of the inductor 14 is set to a value obtained by complementary control when the input voltage Vin and the output voltage Vout are the same. However, this is not limited thereto. For example, an upper-limit value may be determined for the peak current Ip of the current, and the upper-limit value of the time ratio may be set to a value that does not exceed the upper-limit value of the peak current Ip. The peak Ip can be predicted based on the input voltage Vin, or the input voltage Vin and the output voltage Vout, and the like.

(Regarding Prohibition of Power Running Control or Power Regeneration Control)

The method of judging whether or not the fluctuation speed of the average current $IL0$ of the inductor 14 is the threshold speed dIth or higher is not limited to that given as an example according to the above-described fifth embodiment (FIG. 13). For example, when the controlled variable of the control device is the output current Tout of the converter CNV, whether or not the fluctuation speed of the target voltage is the threshold speed dIth or higher may be judged.
(Regarding Switching)

The conditions for prohibiting switching from complementary control to the process by power running control or the process by power regeneration control are not limited to the above-described conditions. For example, the condition may be when the fluctuation amount of the load current Iload is a prescribed value or more. This in light of the controllability of the output voltage decreasing as a result of power running control or power regeneration control being used when the fluctuation in the load current Iload is large. The input parameter for the judging whether or not the fluctuation amount of the load current Iload is the prescribed value or more is not limited to the load current Iload. For example, the input parameter may be the fluctuation speed or the like of a torque instruction value of the motor generator 10, or a fluctuation speed or the like of the current required by the output side.
(Regarding Switching from Power Running Control or Power Regeneration Control to Complementary Control)

The switching is not limited to when a judgment is made that the direction of the current flowing through the inductor 14 is not reversed. For example, control may be switched to complementary control when a difference between a controlled variable, such as the output voltage Vout, and the instruction value is a prescribed amount or more.
(Regarding Reverse Prediction)

Reverse prediction is not limited to that given as an example according to the sixth embodiment (FIG. 15). For example, the coefficient in the above-described expression (c11) may be changed from "Vout/Vin" to "Vref/Vin". In addition, the target voltage Vref in the above-described expression (c12) may be an averaged value of the current output voltage Vout and the target voltage Vref, such as "(Vref+Vout)/2".

In addition, for example, when complementary control is performed and the complementary control is performed by feedback control, the peak current Ip may be predicted based on the updated manipulated variable, the input voltage Vin, and the output voltage Vout. Here, the output voltage Vout may be predicted from the updated manipulated variable, and the predicted output voltage Vout may be used in place of the target voltage Vref in the average current calculating section 32. This can be considered an example of reverse prediction in which the instruction value (target voltage Vref) of the controlled variable is not the input. However, in this instance as well, the target voltage Vref is used in the calculation of the updated manipulated variable. Therefore, when the reverse prediction includes feedback control, the reverse prediction is performed with the target voltage Vref as an input parameter. In this regard, a state in which the instruction value of the controlled variable is not used as the input parameter in reverse prediction is limited to an instance in which control is performed by a request other than control of the instruction value of the controlled variable, and the like.

In addition, reverse prediction is not limited to that using the input voltage Vin as the input parameter. For example, without using the output value of the voltage sensor 18, a fluctuation speed ΔI of the current flowing through the inductor 14 when the switching element Sn was turned ON immediately prior may be used as the input. In this instance, because "LΔI" can be considered the input voltage Vin, functions can be constructed that calculate the average current IL0 and the peak current Ip with the fluctuation speed ΔI as an independent variable.

In addition, reverse prediction is not limited to that using the load current Iload detected by the current sensor 22a as the input parameter. For example, the average current IL0 may be calculated in the manner according to above-described first embodiment, and the peak current Ip may be calculated in the manner according to the above-described sixth embodiment (FIG. 15). In this instance as well, as a result of the target voltage Vref being used as the input parameter, whether or not the direction of the current flowing through the inductor 14 is reversed as a result of the target voltage Vref being achieved in current continuous mode can be predicted.

The period during which the prediction is performed is not limited to a period that is a plurality of ON/OFF cycles of the switching element S# or more. For example, the period may be a single period.
(Regarding Current Calculation)

In the numerator on the right side in the expression (c14), when at least either of the loss in the inverter INV and the loss in the motor generator 10 is sufficiently small compared to the other terms, the loss in the inverter INV or the loss in the motor generator 10 may be eliminated from the numerator on the right side.
(Regarding Reverse Judgment)

The method of judging whether or not the direction of the current flowing through the inductor 14 is reversed is not limited to that given as an example according to the above-described first embodiment. For example, whether or not there is a sampling value with a different sign (i.e direction of current) among sampling values of a plurality of samples during the single period "1/fc" of the current IL flowing through the inductor 14 may be judged.
(Regarding Mode Determination)

Mode determination is not limited to that given as an example according to the above-described sixth embodiment (FIG. 15). For example, the process can be modified in the manner described in "Regarding reverse prediction".
(Regarding Dead Time Compensation)

The dead time generating process is not required in current discontinuous mode. Therefore, if the dead time generating process is not performed, the dead time compensating process can be eliminated.

In addition, for example, when complementary control is performed by feedback control, the dead time compensation amount can be generated as a feedback manipulated variable.

Furthermore, even when complementary control is performed only by feed forward control, dead time compensation is not a requisite.
(Regarding Power Running-Mode Current Restricting Element)

The power running-mode current restricting element is not limited to the parallel-connected member composed of the IGBT and the diode. For example, the power running-mode current restricting element may be a power metal-oxide-semiconductor (MOS) field-effect transistor. In this instance, a rectifying function of a parasitic diode may be used. Furthermore, the power running-mode current restricting element may be a parallel-connected member composed of a power MOS field-effect transistor and a diode.
(Regarding Power Regeneration-Mode Current Restricting Element)

The power regeneration-mode current restricting element is not limited to the parallel-connected member composed of the IGBT and the diode. For example, the power regeneration-mode current restricting element may be a power MOS field-effect transistor. In this instance, a rectifying function of a parasitic diode may be used. Furthermore, the power regeneration-mode current restricting element may be a parallel-connected member composed of a power MOS field-effect transistor and a diode.

(Regarding Power Conversion Circuit)

The power conversion circuit is not limited to that given as an example in FIG. 1 and the like. For example, the power conversion circuit may be that given as an example in FIG. 17. Here, a serially connected member composed of a switching element Sp1 and a switching element Sn1 is connected in parallel with the battery 12. In addition, a serially connected member composed of a switching element Sp2 and a switching element Sn2 is connected in parallel with the smoothing capacitor 16. The connection point of the switching element Sp1 and the switching element Sn1, and the connection point of the switching element Sp2 and the switching element Sn2 are connected by the inductor 14. Diodes Dp1, Dp2, Dn1, and Dn2 are respectively connected in reverse parallel with the switching elements Sp1, Sp2, Sn1, and Sn2. Here, when the battery 12 is the input side, the switching element Sp1 and the diode Dp1, and the switching element Sn2 and the diode Dn2 serve as the power running-mode current restricting element. The switching element Sp2 and the diode Dp2, and the switching element Sn1 and the diode Dn1 serve as the power regeneration-mode current restricting element.

Figure 18:
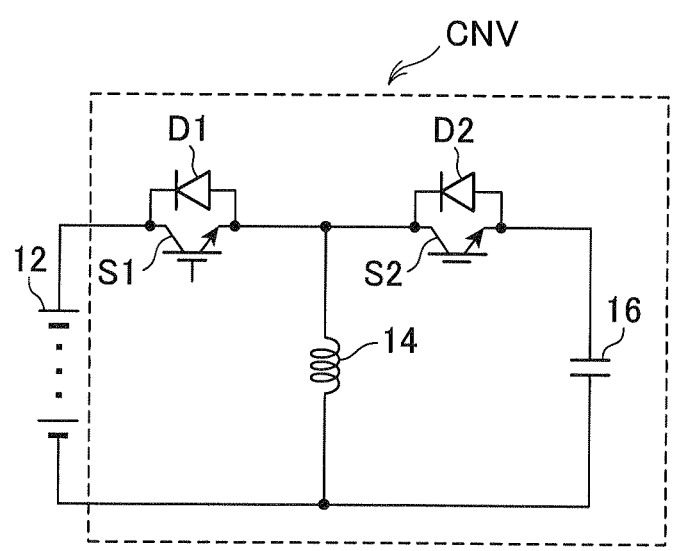
FIG. 18 is a circuit diagram of a configuration of a power conversion circuit in a variation example of the embodiments.

In addition, the power conversion circuit may be that given as an example in FIG. 18. Here, a switching element S1 and the inductor 14 are connected in parallel with the battery 12. In addition, a switching element S2 and the inductor 14 are connected in parallel with the smoothing capacitor 16. Diodes D1 and D2 are respective connected in reverse parallel with the switching elements S1 and S2. Here, when the battery 12 is the input side, the switching element S1 and the diode D1 serve as the power running-mode current restricting element, and the switching element S2 and the diode D2 serve as the power regeneration-mode current restricting element.

(Regarding the Number of Inductors)

Figure 19:
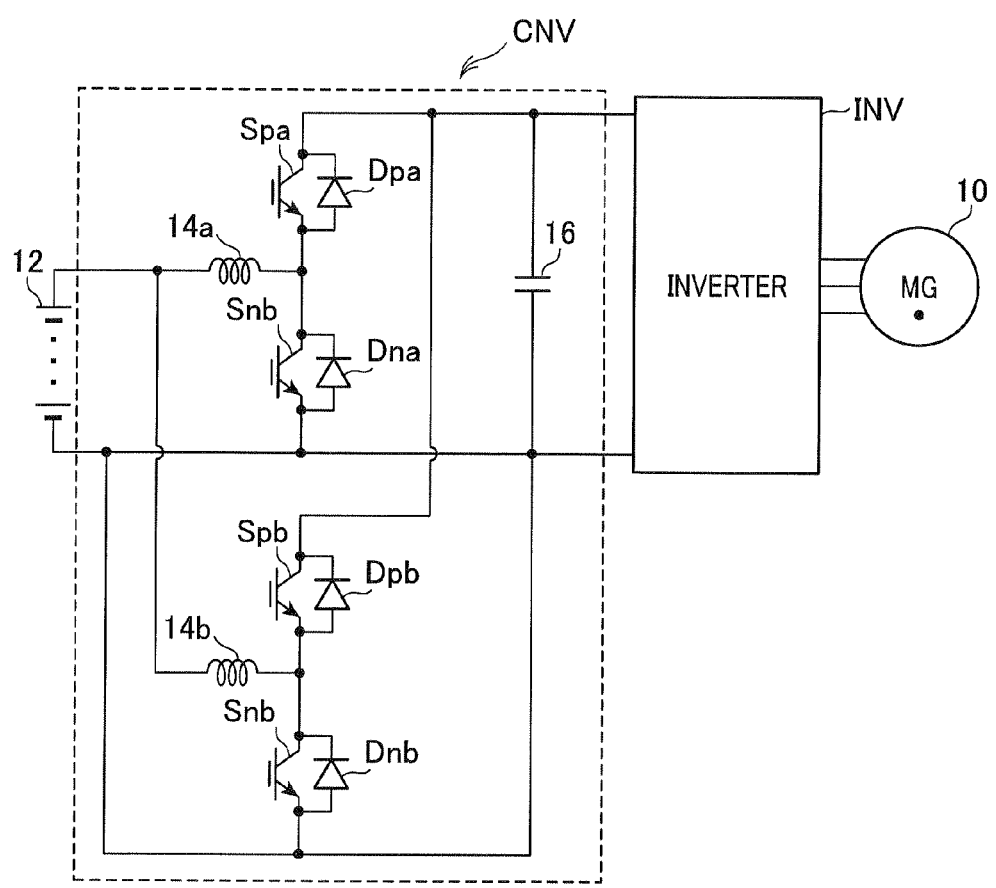
FIG. 19 is a circuit diagram of a configuration of a power conversion circuit in a variation example of the embodiments.

The number of inductors is not limited to one. For example, as shown in FIG. 19, a switching element Spa and a switching element Sna, and a switching element Spb and a switching element Snb may be respectively connected to an inductor 14a and an inductor 14b. In this instance, a so-called multiphase process may be performed in which the switching phases of the switching element Spa and the switching element Sna, and the switching element Spb and the switching element Snb are shifted. In this instance, the phases of the currents respectively flowing through the inductors 14a and 14b also differ from each other.

(Regarding Inverter (INV))

Figure 20:
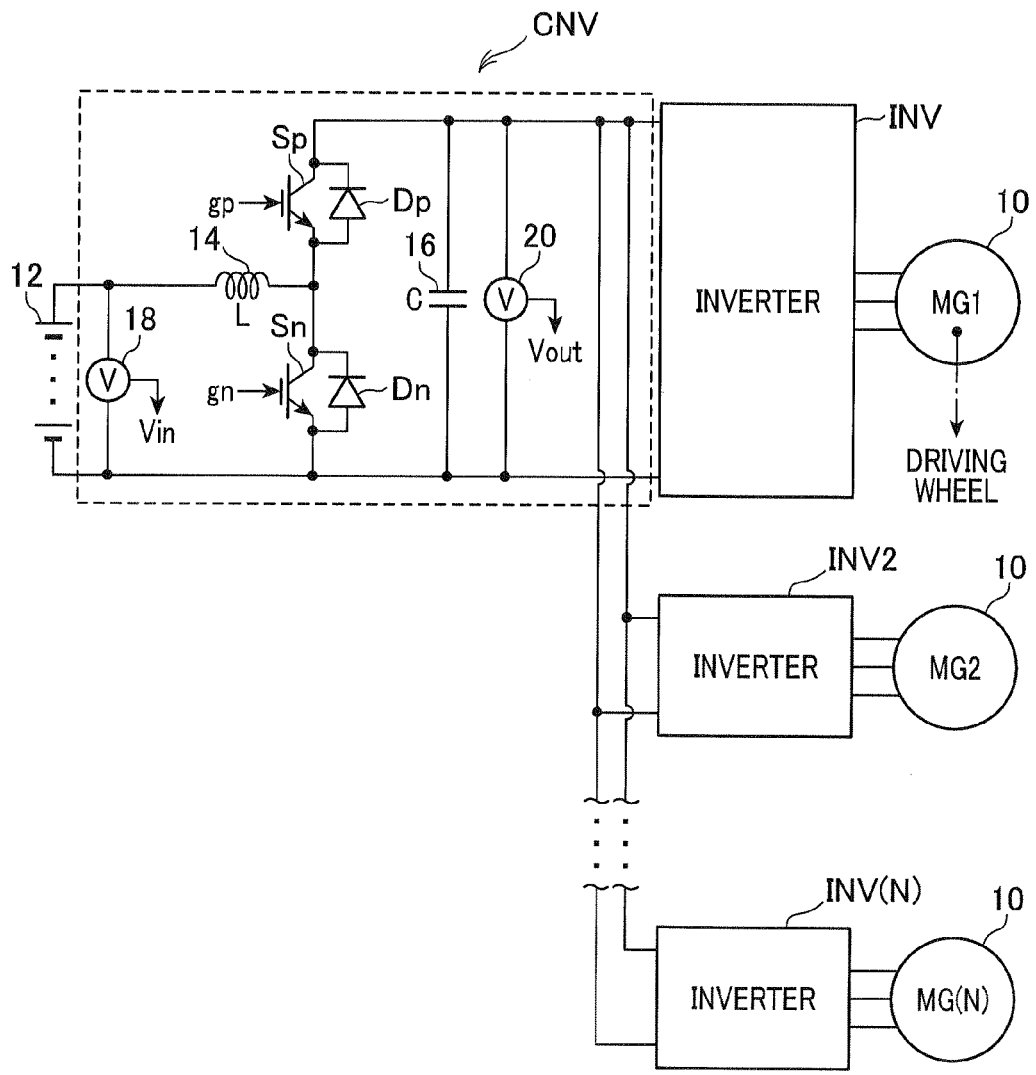
FIG. 20 is a circuit diagram of a configuration of a power conversion circuit in a variation example of the embodiments.

As shown in FIG. 20, a configuration is possible in which an N-number (N being an integer of 2 or higher) of inverters are connected in parallel with a single converter CNV. In this instance, the average current IL0 can be calculated by a following expression (c15).

[Formula 15]

$$IL0 = \frac{Pout}{Vin} = \frac{\Delta Pc + \sum_{i=1}^{N}(Ploss[i] + Pm[i])}{Vin} \quad (c15)$$

In the expression (C15), Ploss[i] (i=1 to N) indicates the total loss of an (i)th inverter INV(i) and an (i)th motor generator MG(i) connected to the (i)th inverter INV(i). Pm[i] indicates the motor power of the (i)th motor generator MG(i).

(Regarding Use of Power Conversion Circuit)

The power conversion circuit is not limited to that which intermediates exchange of power between the inverter (INV) and the battery 12 connected to a rotating electrical machine serving as a main driving engine. For example, the power conversion circuit may be that which intermediates exchange of power between an inverter and a battery 12 connected to a rotating electrical machine within a compressor included in an on-board air-conditioning device. In addition, the power conversion circuit is not limited to that in which the inverter is connected on the output side. For example, a terminal of the rotating electrical machine may be connected as described in JP-A-2011-188638.

(Other)

Figure 17:
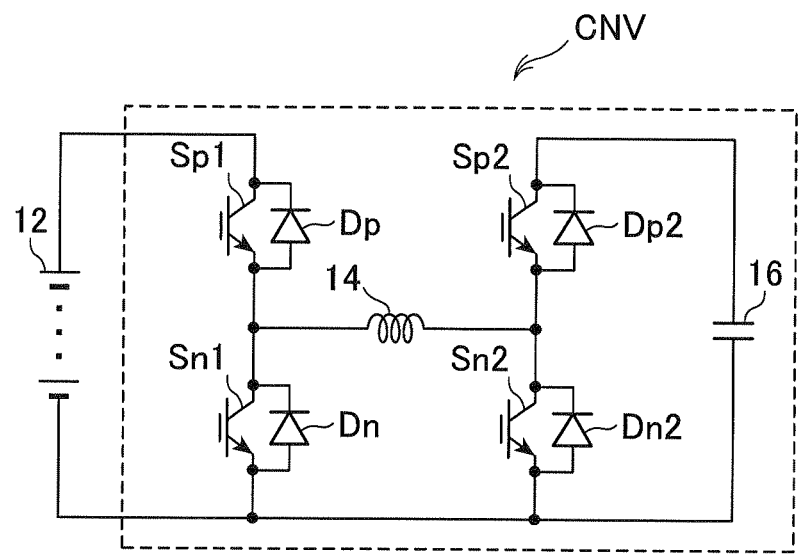
FIG. 17 is a circuit diagram of a configuration of a power conversion circuit in a variation example of the embodiments.

The method of calculating the average current IL0 described according to the seventh embodiment may be applied to a system including a converter shown in above-described FIG. 17 to FIG. 19.

What is claimed is:

1. A power conversion control device that electronically controls a power conversion circuit
    having an inductor,
    a power running-mode current restricting element, and
    a power regeneration-mode current restricting element, the power running-mode current restricting element and the power regeneration-mode current restricting element being connected to the inductor and each configured by a parallel circuit composed of a rectifying element and a switching element that is opened and closed by electronic control from outside, wherein:
    the power conversion control device performs
    power running control for, as power running control of the power conversion circuit, maintaining the switching element of the power regeneration-mode current restricting element in an open state while opening and closing the switching element of the power running-mode current restricting element;
    power regeneration control for, as power regeneration control of the power conversion circuit, maintaining the switching element of the power running-mode current restricting element in an open state while opening and closing the switching element of the power regeneration-mode current restricting element;
    complementary control for, as complementary control of the power conversion circuit, alternately closing the respective switching elements of the power running-mode current restricting element and the power regeneration-mode current restricting element;
    judgment for judging whether or not a direction of a current flowing through the inductor during either a closed period of the switching element of the power running-mode current restricting element or a closed period of the switching element of the power regeneration-mode current restricting element is reversed in response to control of the complementary control; and
    switching for switching control of the power conversion circuit from the complementary control to the power running control or the power regeneration control when it is judged that the direction is reversed,
    wherein
    the judgment is performed by judging whether or not an absolute value of an average value of the current flowing through the inductor is equal to or larger than ½ of a peak current based on a fluctuation amount of the current flowing through the inductor, and
    the switching is performed by switching the control of the power conversion circuit to the complementary control when it is judged that the absolute value of an average value of the current is equal to or larger than ½ of the leak current, and switch the control of the power conversion circuit to either the power running control or the power regeneration control.

2. The power conversion control device according to claim 1, wherein:
the judgment predicts whether or not the direction of the current flowing through the inductor will be reversed under a premise that the complementary control would be performed.

3. The power conversion control device according to claim 2, wherein:
the switching process includes a process for deciding whether the power running control is to be performed or the power regeneration control is to be performed for setting a controlled variable of the power conversion control device as an instruction value thereof.

4. The power conversion control device according to claim 1, wherein:
the average value of the current is calculated based on an input voltage to the power conversion circuit, an output voltage from the power conversion circuit, and a current outputted outside from the power conversion circuit.

5. The power conversion control device according to claim 4, wherein:
the power conversion circuit includes a smoothing capacitor, the power conversion circuit is connected to a rotating electrical machine by the smoothing capacitor, and the average value of the current used in the judgment is calculated based on power passing through the power regeneration-mode current restricting element, input/output power of the smoothing capacitor, and input/output power of the rotating electrical machine.

6. The power conversion control device according to claim 5, wherein:
the power running control and the power regeneration control are discontinued when a fluctuation speed of the average current of the inductor has become a prescribed value or higher.

7. The power conversion control device according to claim 6, wherein:
the power conversion control device controls the output voltage of the power conversion circuit so as to become a target voltage, and switches from the power running control to the power regeneration control at the time when the output voltage exceeds the target value by the prescribed value or more in a duration that the power running control is performed.

8. The power conversion control device according to claim 7, wherein:
the power conversion control device controls the output voltage of the power conversion circuit so as to become a target voltage, and switches from the power regeneration control to the power running control at the time when the output voltage becomes less than the target value by the prescribed value or more in a duration that a power regeneration control is performed.

9. The power conversion control device according to claim 8, wherein:
the power conversion control device uses at least one of the output voltage and the output current of the power conversion circuit as a controlled variable, and during power running control, uses the length of one single period of an opening operation and a closing operation of the power running-mode current restricting element as a manipulated variable for controlling the controlled variable.

10. The power conversion control device according to claim 9, wherein:
the power conversion control device uses at least one of the output voltage and the output current of the power conversion circuit as a controlled variable, and during power regeneration control, uses the length of one single period of an opening operation and a closing operation of the power regeneration-mode current restricting element as a manipulated variable for controlling the controlled variable.

11. The power conversion control device according to claim 10, wherein:
the power conversion control device uses the output voltage of the power conversion circuit as a controlled variable, and during power running control, uses a time ratio of a closing operation period in relation to the length of one single period of the opening operation and the closing operation of the power running-mode restricting element as a manipulated variable for controlling the controlled variable, and performs a guard process on the time ratio using both an input voltage and the output voltage of the power conversion circuit as inputs.

12. The power conversion control device according to claim 11, wherein:
the power conversion control device uses the output voltage of the power conversion circuit as a controlled variable, and during power regeneration control, uses a time ratio of a closing operation period in relation to one single period of the opening operation and the closing operation of the power regeneration-mode restricting element as a manipulated variable for controlling the controlled variable, and performs a guard process on the time ratio using at least one of an input voltage and the output voltage of the power conversion circuit as inputs.

13. The power conversion control device according to claim 12, wherein:
in the power conversion circuit, a direct-current voltage source is connected to one side thereof, and an inverter which has been connected to a main driving engine is connected to another side thereof.

14. A power conversion device comprising:
a power conversion circuit having an inductor, a power running-mode current restricting element, and a power regeneration-mode current restricting element, the power running-mode current restricting element and the power regeneration-mode current restricting element being connected to the inductor and each configured by a parallel circuit composed of a rectifying element and a switching element that is opened and closed by electronic control from outside; and
a control device that electronically controls the power conversion circuit, wherein
the control device performs
i) power running control for, as power running control of the power conversion circuit, maintaining the switching element of the power regeneration-mode current restricting element in an open state while opening and closing the switching element of the power running-mode current restricting element;
ii) power regeneration control for, as power regeneration control of the power conversion circuit, maintaining the switching element of the power running-mode current restricting element in an open state while opening and closing the switching element of the power regeneration-mode current restricting element;

iii) complementary control for, as complementary control of the power conversion circuit, alternately closing the respective switching elements of the power running-mode current restricting element and the power regeneration-mode current restricting element; and iv) judgment for judging whether or not a direction of a current flowing through the inductor during either a closed period of the switching element of the power running-mode current restricting element or a closed period of the switching element of the power regeneration-mode current restricting element is reversed in response to control of the complementary control; and switching for switching control of the power conversion circuit from the complementary control to the power running control or the power regeneration control when it is judged that the direction is reversed, wherein the judgment is performed by judging whether or not an absolute value of an average value of the current flowing through the inductor is equal to or larger than ½ of a leak current based on a fluctuation amount of the current flowing through the inductor, and the switching is performed by switching the control of the power conversion circuit to the complementary control when it is judged that the absolute value of an average value of the current is equal to or larger than ½ of the peak current, and switch the control of the power conversion circuit to either the power running control or the power regeneration control.

15. The power conversion device according to claim 14, wherein:

the power conversion circuit includes an inductor that is connected between a battery and the connection point for the power running-mode current restricting element and the power regeneration-mode current restricting element, and a capacitor that is connected in parallel with a serially connected member composed of power running-mode current restricting element and the power regeneration-mode current restricting element.

* * * * *